US010921782B2

(12) United States Patent
Mehr et al.

(10) Patent No.: US 10,921,782 B2
(45) Date of Patent: *Feb. 16, 2021

(54) REAL-TIME ADAPTIVE CONTROL OF ADDITIVE MANUFACTURING PROCESSES USING MACHINE LEARNING

(71) Applicant: Relativity Space, Inc., Inglewood, CA (US)

(72) Inventors: Edward Mehr, Santa Monica, CA (US); Tim Ellis, Inglewood, CA (US); Jordan Noone, Inglewood, CA (US)

(73) Assignee: RELATIVITY SPACE, INC., Inglewood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,720

(22) Filed: Nov. 26, 2019

(65) Prior Publication Data

US 2020/0096970 A1 Mar. 26, 2020

Related U.S. Application Data

(63) Continuation of application No. 16/234,325, filed on Dec. 27, 2018, now Pat. No. 10,539,952, which is a (Continued)

(51) Int. Cl.
*G05B 19/4099* (2006.01)
*G06N 20/00* (2019.01)
(Continued)

(52) U.S. Cl.
CPC ........ *G05B 19/4099* (2013.01); *B22F 3/1055* (2013.01); *B33Y 50/02* (2014.12);
(Continued)

(58) Field of Classification Search
None
See application file for complete search history.

(56) References Cited

U.S. PATENT DOCUMENTS 5,751,910 A    5/1998  Bryant et al.
6,122,564 A    9/2000  Koch et al.
(Continued)

FOREIGN PATENT DOCUMENTS

JP      H03107470 A       5/1991
WO      WO-2009154484 A2  12/2009
(Continued)

OTHER PUBLICATIONS

Additive Manufacturing of Ti-6Al-4V Alloy Components for Spacecraft Applications. Tech Briefs Media Group (2014).
(Continued)

*Primary Examiner* — Mohammad Ali
*Assistant Examiner* — Saad M Kabir
(74) *Attorney, Agent, or Firm* — Loza & Loza, LLP; Gordon R. Lindeen, III

(57) ABSTRACT

Methods for control of post-design free form deposition processes or joining processes are described that utilize machine learning algorithms to improve fabrication outcomes. The machine learning algorithms use real-time object property data from one or more sensors as input, and are trained using training data sets that comprise: i) past process simulation data, past process characterization data, past in-process physical inspection data, or past post-build physical inspection data, for a plurality of objects that comprise at least one object that is different from the object to be fabricated; and ii) training data generated through a repetitive process of randomly choosing values for each of one or more input process control parameters and scoring adjustments to process control parameters as leading to either undesirable or desirable outcomes, the outcomes based respectively on the presence or absence of defects detected in a fabricated object arising from the process control parameter adjustments.

19 Claims, 17 Drawing Sheets

Related U.S. Application Data continuation of application No. 15/604,473, filed on May 24, 2017, now Pat. No. 10,234,848.

(51) Int. Cl.
| | | |
|---|---|---|
| *G06N 3/04* | (2006.01) | |
| *G06N 20/10* | (2019.01) | |
| *B33Y 50/02* | (2015.01) | |
| *B22F 3/105* | (2006.01) | |
| *G06N 3/08* | (2006.01) | |
| *G06N 7/02* | (2006.01) | |
| *G06N 5/00* | (2006.01) | |
| *G06N 7/00* | (2006.01) | |

(52) U.S. Cl.
CPC ............ *G06N 3/0454* (2013.01); *G06N 3/08* (2013.01); *G06N 7/02* (2013.01); *G06N 20/00* (2019.01); *G06N 20/10* (2019.01); *B22F 2003/1057* (2013.01); *G05B 2219/35134* (2013.01); *G05B 2219/45165* (2013.01); *G05B 2219/49011* (2013.01); *G05B 2219/49017* (2013.01); *G05B 2219/49018* (2013.01); *G05B 2219/49023* (2013.01); *G06N 3/084* (2013.01); *G06N 5/003* (2013.01); *G06N 7/005* (2013.01)

(56) References Cited

U.S. PATENT DOCUMENTS

| | | |
|---|---|---|
| 6,553,275 B1 | 4/2003 | Mazumder |
| 6,680,456 B2 | 1/2004 | Adams |
| 6,710,280 B2 | 3/2004 | Mazumder et al. |
| 6,793,140 B2 | 9/2004 | Mazumder |
| 6,822,194 B2 | 11/2004 | Low et al. |
| 6,859,681 B1 | 2/2005 | Alexander |
| 6,925,346 B1 | 8/2005 | Mazumder et al. |
| 6,937,921 B1 | 8/2005 | Mazumder |
| 7,139,633 B2 | 11/2006 | Mazumder et al. |
| 7,286,893 B1 | 10/2007 | Mazumder |
| 7,326,377 B2 | 2/2008 | Adams |
| 7,765,022 B2 | 7/2010 | Mazumder et al. |
| 7,965,754 B1 | 6/2011 | Saint et al. |
| 8,153,183 B2 | 4/2012 | Skubic et al. |
| 8,419,996 B2 | 4/2013 | Swanson et al. |
| 8,461,474 B2 | 6/2013 | Stecker et al. |
| 8,467,978 B2 | 6/2013 | Huffman et al. |
| 8,546,717 B2 | 10/2013 | Stecker |
| 8,598,523 B2 | 12/2013 | Stecker et al. |
| 8,613,846 B2 | 12/2013 | Wu et al. |
| 8,629,368 B2 | 1/2014 | Mazumder et al. |
| 8,663,533 B2 | 3/2014 | Swanson et al. |
| 8,665,479 B2 | 3/2014 | Tan et al. |
| 8,678,535 B2 | 3/2014 | Beier et al. |
| 8,781,615 B2 | 7/2014 | Kritchman et al. |
| 8,809,780 B2 | 8/2014 | Stecker et al. |
| 8,836,934 B1 | 9/2014 | Safai et al. |
| 9,038,368 B2 | 5/2015 | Fuller |
| 9,044,827 B2 | 6/2015 | Song et al. |
| 9,120,151 B2 | 9/2015 | Godfrey et al. |
| 9,174,300 B2 | 11/2015 | Stecker et al. |
| 9,192,990 B2 | 11/2015 | Meyer et al. |
| 9,327,350 B2 | 5/2016 | Mannella et al. |
| 9,365,021 B2 | 6/2016 | Villamar |
| 9,399,320 B2 | 7/2016 | Johnson et al. |
| 9,417,627 B2 | 8/2016 | Napadensky et al. |
| 9,507,555 B2 | 11/2016 | Liu et al. |
| 9,522,501 B2 | 12/2016 | Lyons et al. |
| 2003/0127431 A1 | 7/2003 | Pratt et al. |
| 2004/0060639 A1 | 4/2004 | White |
| 2008/0155442 A1 | 6/2008 | Pannese et al. |
| 2013/0223724 A1 | 8/2013 | Wersborg et al. |
| 2014/0014629 A1 | 1/2014 | Stecker et al. |
| 2015/0004046 A1 | 1/2015 | Graham et al. |
| 2015/0024233 A1 | 1/2015 | Gunther |
| 2015/0040364 A1 | 2/2015 | Ogasahara et al. |
| 2015/0045928 A1 | 2/2015 | Perez et al. |
| 2015/0048209 A1 | 2/2015 | Hoyt et al. |
| 2015/0055085 A1 | 2/2015 | Fonte et al. |
| 2015/0060422 A1 | 3/2015 | Liebl et al. |
| 2015/0063903 A1 | 3/2015 | Matthews et al. |
| 2015/0064299 A1 | 3/2015 | Koreis et al. |
| 2015/0081080 A1 | 3/2015 | Tseng |
| 2015/0097746 A1 | 4/2015 | Wilson et al. |
| 2015/0158244 A1 | 6/2015 | Tibbits et al. |
| 2015/0217520 A1 | 8/2015 | Karpas et al. |
| 2015/0219444 A1 | 8/2015 | Bamberg et al. |
| 2015/0240746 A1 | 8/2015 | Zhang et al. |
| 2015/0286201 A1 | 10/2015 | Marsh et al. |
| 2015/0294032 A1 | 10/2015 | Lagally et al. |
| 2015/0298213 A1 | 10/2015 | Beyer et al. |
| 2015/0321427 A1 | 11/2015 | Gunnarsson et al. |
| 2015/0328842 A1 | 11/2015 | Stauffer et al. |
| 2015/0331402 A1 | 11/2015 | Lin et al. |
| 2015/0367579 A1 | 12/2015 | Laudrain |
| 2015/0378348 A1 | 12/2015 | Gupta et al. |
| 2016/0010863 A1 | 1/2016 | Ott et al. |
| 2016/0016254 A1 | 1/2016 | Stecker et al. |
| 2016/0018320 A1 | 1/2016 | Hess et al. |
| 2016/0039146 A1 | 2/2016 | Swanson et al. |
| 2016/0039147 A1 | 2/2016 | Crump et al. |
| 2016/0056555 A1 | 2/2016 | Woida-O'Brien |
| 2016/0084578 A1 | 3/2016 | Kusuda |
| 2016/0108483 A1 | 4/2016 | Meyer et al. |
| 2016/0125594 A1 | 5/2016 | Becker et al. |
| 2016/0136759 A1 | 5/2016 | Broda |
| 2016/0136891 A1 | 5/2016 | Benthien et al. |
| 2016/0144567 A1 | 5/2016 | Müller et al. |
| 2016/0144574 A1 | 5/2016 | Eilken et al. |
| 2016/0169821 A1 | 6/2016 | Meyer et al. |
| 2016/0170387 A1 | 6/2016 | Ihara |
| 2016/0184893 A1 | 6/2016 | Dave et al. |
| 2016/0243649 A1 | 8/2016 | Zheng et al. |
| 2016/0243762 A1 | 8/2016 | Fleming et al. |
| 2016/0251093 A1 | 9/2016 | Hijmans et al. |
| 2016/0257033 A1 | 9/2016 | Jayanti et al. |
| 2016/0275670 A1 | 9/2016 | Ladewig |
| 2016/0297148 A1 | 10/2016 | Ladewig |
| 2016/0318130 A1 | 11/2016 | Stempfer et al. |
| 2016/0340060 A1 | 11/2016 | Matthews et al. |
| 2016/0356245 A1 | 12/2016 | Danforth et al. |
| 2017/0032281 A1 | 2/2017 | Hsu |
| 2017/0182595 A1 | 6/2017 | Nelson et al. |
| 2017/0304896 A1 | 10/2017 | Kovalchuk et al. |
| 2017/0326681 A1 | 11/2017 | Sidhu et al. |
| 2018/0341248 A1 | 11/2018 | Mehr et al. |
| 2019/0094842 A1 | 3/2019 | Lee et al. |

FOREIGN PATENT DOCUMENTS

| | | |
|---|---|---|
| WO | WO-2015198352 A2 | 12/2015 |
| WO | WO-2016029424 A1 | 3/2016 |
| WO | WO-2016047874 A1 | 3/2016 |
| WO | WO-2016085965 A1 | 6/2016 |
| WO | WO-2016179121 A1 | 11/2016 |

OTHER PUBLICATIONS

Asadi-Eydivand et al.: Optimal design of a 3D-printed scaffold using intelligent evolutionary algorithms. In: Applied Soft Computing. Applied Soft computing 39:36-47 (2016) Retrieved from (https://ac.els-cdn.com/S156£349461500722X/1-52.0-S156849461500722X-main.pdf?).

Ding et al.: Advanced Design for Additive Manufacturing: 3D Slicing and 2D Path Planning. Chapter 1 of New Trends in 3D Printing. Jul. 2016. DOI: 10.5772/63042.

Garanger et al.: Foundations of Intelligent Additive Manufacturing. In: arXiv preprint. Retrieved from (https://arxiv.org/pdf/1705.00960.pdf), (9< gwmw class=ginger-module-highlighter-mistake-type-1 id=gwmw-15774695522458639195002>pgs</gwmw>.) (2017).

(56) References Cited

OTHER PUBLICATIONS

Guessasma et al.: Challenges of additive manufacturing technologies from an optimisation perspective. Int. J. Simul. Multisci. Des. Optim. vol. 6, 2015, A9. DOI: 10.1051/smdo/2016001. Published online: Jan. 26, 2016.

Heralić: Monitoring and Control of Robotized Laser Metal-Wire Deposition. Doctoral thesis. 2012. Chalmers University of Technology, Sweden. ISBN: 978-91-7385-655-3. 82 pages.

Lampert et al.: Active structured learning for high-speed object detection. In: Joint Pattern Recognition Symposium. Retrieved from (https://cvmlist.ac.at/papers/lampert-dagm2009.pdf), (10<gwmw class=ginger-module-highlighter-mistake-type-1 id=gwmw-15774696034100051819531>pgs</gwmw>.) (2009).

Novelli et al.: On the effectiveness of surface severe plastic deformation by shot peening at cryogenic temperature. Applied Surface Science, 389:1169-1174, 2016.

PCT/US2018/034147 International Search Report and Written Opinion dated Aug. 8, 2018.

PCT/US2019/062223 International Search Report and Written Opinion dated Feb. 6, 2020.

Purtonen et al.: Monitoring and adaptive control of laser processes. In: Physics< gwmw class=ginger-module-highlighter-mistake-type-1 id=gwmw-15774703238494372444199>Procedia</gwmw> 56:1218-1231 (2014). Retrieved from (https://ac.els-cdn.com/S1875389214001837/1-s2.0-S1875389214001837-main.pdf?).

U.S. Appl. No. 15/464,675 Restriction Requirement dated Mar. 21, 2019.

U.S. Appl. No. 15/464,675 Office Action dated Dec. 26, 2019.

U.S. Appl. No. 15/604,473 First Action Interview Pilot Program, Pre-Interview Communication, dated Dec. 15, 2017.

U.S. Appl. No. 15/604,473 Office Action dated Jul. 2, 2018.

Yap et al.: Review of selective laser melting: Materials and applications. Applied Physics Reviews 2(4):041101. Dec. 2015. DOI: 10.1063/1.4935926.

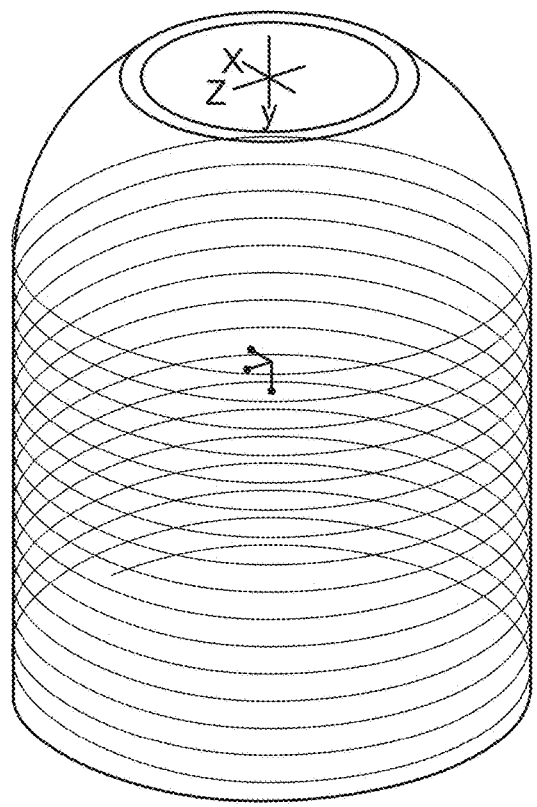 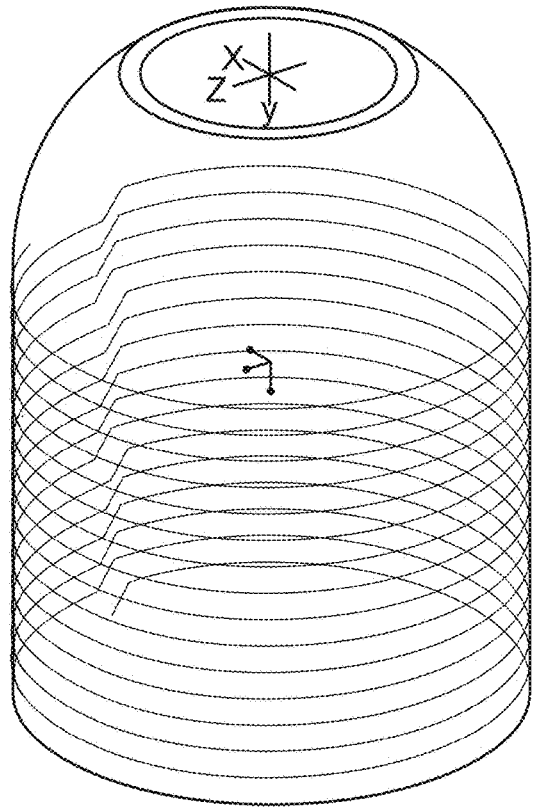
FIG. 3A     FIG. 3B
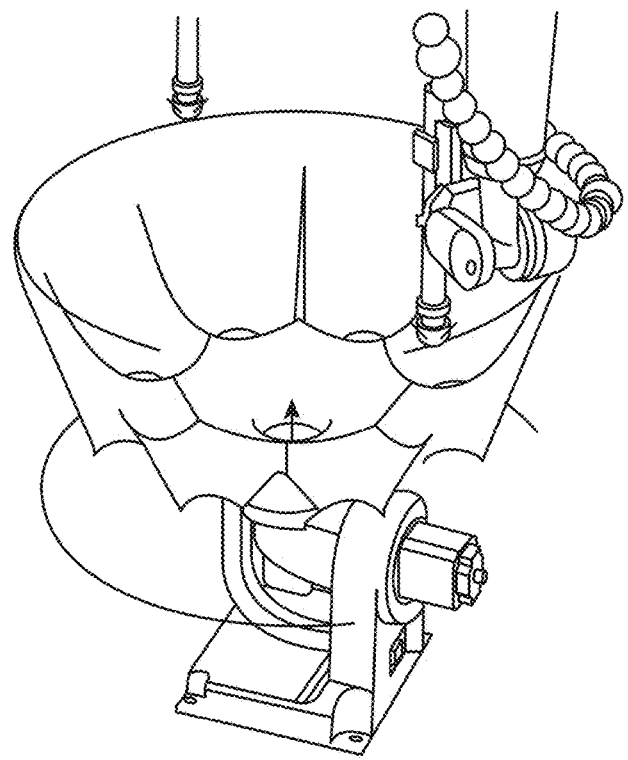
FIG. 3C

US 10,921,782 B2

REAL-TIME ADAPTIVE CONTROL OF ADDITIVE MANUFACTURING PROCESSES USING MACHINE LEARNING

CROSS-REFERENCE

This application is a continuation of U.S. patent application Ser. No. 16/234,325 filed Dec. 27, 2018, now allowed, which is a continuation of U.S. patent application Ser. No. 15/604,473 filed May 24, 2017, now issued as U.S. Pat. No. 10,234,848 on Mar. 19, 2019, the contents of which are hereby incorporated by reference in their entirety.

BACKGROUND

Additive manufacturing processes are fabrication techniques that allow one to produce functional complex parts layer by layer, without the use of molds or dies. Despite recent advances in the methods and apparatus used for various types of additive manufacturing, a need exists for methods that allow rapid optimization and adjustment of the process control parameters used in response to changes in process or environmental parameters, as well as for improving the quality of the parts that are produced. Methods and systems are disclosed for performing automated classification of object defects using machine learning algorithms. Also disclosed are methods and systems for performing real-time adaptive control of free form deposition or joining processes, including additive manufacturing or welding processes, to improve process yield, throughput, and quality.

SUMMARY

Disclosed herein are methods for real-time adaptive control of a free form deposition process or a joining process, the methods comprising: a) providing an input design geometry for an object; b) providing a training data set, wherein the training data set comprises process simulation data, process characterization data, in-process inspection data, post-build inspection data, or any combination thereof, for a plurality of design geometries or portions thereof that are the same as or different from the input design geometry of step (a); c) providing a predicted optimal set or sequence of one or more process control parameters for fabricating the object, wherein the predicted optimal set of one or more process control parameters are derived using a machine learning algorithm that has been trained using the training data set of step (b); and d) performing the free form deposition process or the joining process to fabricate the object, wherein real-time process characterization data is provided as input to the machine learning algorithm to adjust one or more process control parameters in real-time.

In some embodiments, steps (b)-(d) are performed iteratively and process characterization data, in-process inspection data, post-build inspection data, or any combination thereof for each iteration is incorporated into the training data set. In some embodiments, the free form deposition process or joining process is a stereolithography (SLA), digital light processing (DLP), fused deposition modeling (FDM), selective laser sintering (SLS), selective laser melting (SLM), or electronic beam melting (EBM), or welding process. In some embodiments, the free form deposition process is a liquid-to-solid free form deposition process. In some embodiments, the liquid-to-solid free form deposition process is a laser metal-wire deposition process. In some embodiments, the process simulation data is provided by performing finite element analysis (FEA), finite volume analysis (FVA), finite difference analysis (FDA), computational fluid dynamics (CFD) calculations, or any combination thereof. In some embodiments, the one or more process control parameters to be predicted or controlled comprise a rate of material deposition, a rate of displacement for a deposition apparatus, a rate of acceleration for a deposition apparatus, a direction of displacement for a deposition apparatus, a location of a deposition apparatus as a function of time (a tool path), an angle of a deposition apparatus with respect to a deposition direction, an angle of overhang in an intended geometry, an intensity of heat flux into a material during deposition, a size and shape of a heat flux surface, a flow rate and angle of shielding gas flow, a temperature of a baseplate, an ambient temperature control during a deposition process, a temperature of a deposition material prior to deposition, a current or voltage setting in a resistive heating apparatus, a voltage frequency or amplitude in an inductive heating apparatus, a choice of deposition material, a ratio by volume or a ratio by weight of deposition materials if more than one deposition material is used, or any combination thereof. In some embodiments, the process simulation data comprises a prediction of a bulk or peak temperature of a deposited material, a cooling rate of a deposited material, a chemical composition of a deposited material, a segregation state of constituents in a deposited material, a geometrical property of a deposited material, an intensity of heat flux out of a material during deposition, an electromagnetic emission from a deposition material, an acoustic emission from a deposition material, or any combination thereof, as a function of a set of specified input process control parameters. In some embodiments, the process characterization data comprises a measurement of a bulk or peak temperature of a deposited material, a cooling rate of a deposited material, a chemical composition of a deposited material, a segregation state of constituents in a deposited material, a geometrical property of a deposited material, a rate of material deposition, a rate of displacement for a deposition apparatus, a location (tool path) of a deposition apparatus, an angle of a deposition apparatus with respect to a deposition direction, a deposition apparatus status indicator, an angle of overhang in a deposited geometry, an angle of overhang in an intended geometry, an intensity of heat flux into a material during deposition, an intensity of heat flux out of a material during deposition, an electromagnetic emission from a deposition material, an acoustic emission from a deposition material, an electrical conductivity of a deposition material, a thermal conductivity of a deposition material, a defect in the geometry of an object being fabricated, or any combination thereof. In some embodiments, the in-process or post-build inspection data comprises data from a visual or machine vision-based inspection of surface finish, a visual or machine vision-based inspection of surface cracks and pores, a test of a mechanical property such as strength, hardness, ductility, fatigue, a test of a chemical property such as composition, segregation of constituent materials, a defect characterization methodology such as X-ray diffraction or imaging, CT scanning, ultrasonic imaging, Eddy current sensor array measurements, or thermography, or any combination thereof. In some embodiments, the machine learning algorithm comprises a supervised learning algorithm, an unsupervised learning algorithm, a semi-supervised learning algorithm, a reinforcement learning algorithm, a deep learning algorithm, or any combination thereof. In some embodiments, the machine learning algorithm comprises an artificial neural network algorithm, a Gaussian process regression algorithm, a logistical model tree algorithm, a random forest algorithm, a fuzzy classifier algorithm, a decision tree algorithm, a hierarchical clustering algorithm, a k-means algorithm, a fuzzy clustering algorithm, a deep Boltzmann machine learning algorithm, a deep convolutional neural network algorithm, a deep recurrent neural network, or any combination thereof. In some embodiments, the machine learning algorithm comprises an artificial neural network. In some embodiments, the artificial neural network comprises an input layer, an output layer, and at least 1 hidden layer. In some embodiments, the artificial neural network comprises an input layer, an output layer, and at least 5 hidden layers. In some embodiments, the artificial neural network comprises an input layer, an output layer, and at least 10 hidden layers. In some embodiments, the number of nodes in the input layer is at least 10. In some embodiments, the number of nodes in the input layer is at least 100. In some embodiments, the number of nodes in the input layer is at least 1,000. In some embodiments, at least one stream of process characterization data is provided to the machine learning algorithm at a rate of at least 10 Hz. In some embodiments, at least one stream of process characterization data is provided to the machine learning algorithm at a rate of at least 100 Hz. In some embodiments, at least one stream of process characterization data is provided to the machine learning algorithm at a rate of at least 1,000 Hz. In some embodiments, the one or more process control parameters are adjusted at a rate of at least 10 Hz. In some embodiments, the one or more process control parameters are adjusted at a rate of at least 100 Hz. In some embodiments, the one or more process control parameters are adjusted at a rate of at least 1,000 Hz. In some embodiments, the method is implemented using a single integrated system comprising a deposition apparatus, a sensor, and a processor. In some embodiments, the method is implemented using a distributed, modular system comprising a first deposition apparatus, a first sensor, and a first processor, wherein the first deposition apparatus, the first sensor, and the first processor are configured to share training data and/or real-time process characterization data via a local area network (LAN), an intranet, an extranet, or an internet. In some embodiments, the training data set resides in the internet cloud. In some embodiments, the sharing of data between the first deposition apparatus, the first sensor, and the first processor is facilitated by use of a data compression algorithm, a data feature extraction algorithm, or a data dimensionality reduction algorithm. In some embodiments, the training data set is shared between and updated using data from a plurality of deposition apparatus and sensors that are configured to share data via a local area network (LAN), an intranet, an extranet, or an internet. In some embodiments, the training data set further comprises process characterization data, in-process inspection data, post-build inspection data, or any combination thereof, that is generated by a skilled operator while manually adjusting the input process control parameters. In some embodiments, as part of the training of the machine learning algorithm, the machine learning algorithm randomly chooses values within a specified range for each of a set of one or more process control parameters, and incorporates the resulting process simulation data, process characterization data, in-process inspection data, post-build inspection data, or any combination thereof, into the training data set to improve a learned model that maps process control parameter values to process outcomes.

Also disclosed herein are systems for controlling a free form deposition process or a joining process, the systems comprising: a) a first deposition apparatus, wherein the deposition apparatus is capable of fabricating an object based on an input design geometry; b) one or more process characterization sensors, wherein the one or more process characterization sensors provide real-time data for one or more process parameters or object properties; and c) a processor programmed to (i) provide a predicted optimal set of one or more input process control parameters, and (ii) to adjust one or more process control parameters in real-time based on a stream of real-time process characterization data provided by the one or more process characterization sensors, wherein the predictions and adjustments are derived using a machine learning algorithm that has been trained using a training data set.

In some embodiments, the system further comprises a computer memory device within which machine learning algorithm software, sensor data from the one or more process characterization sensors, predicted or adjusted values of one or more process control parameters, the training data set, or any combination thereof, is stored. In some embodiments, the first deposition apparatus, the one or more process characterization sensors, and the processor are incorporated into a single integrated system. In some embodiments, the first deposition apparatus, the one or more process characterization sensors, and the processor are configured as distributed system modules that share training data and/or real-time process characterization data via a local area network (LAN), an intranet, an extranet, or an internet. In some embodiments, the training data set resides in the internet cloud, and is shared between and updated using data from a plurality of deposition apparatus and sensors that are configured to share data via a local area network (LAN), an intranet, an extranet, or an internet. In some embodiments, the training data set comprises process simulation data, process characterization data, in-process inspection data, post-build inspection data, or any combination thereof, for a plurality of objects that are the same as or different from the object of step (a). In some embodiments, the one or more process characterization sensors comprise temperature sensors, position sensors, motion sensors, touch/proximity sensors, accelerometers, profilometers, goniometers, image sensors and machine vision systems, electrical conductivity sensors, thermal conductivity sensors, strain gauges, durometers, X-ray diffraction or imaging devices, CT scanning devices, ultrasonic imaging devices, Eddy current sensor arrays, thermographs, deposition apparatus status indicators, or any combination thereof. In some embodiments, the one or more process characterization sensors comprise at least one laser interferometer, machine vision system, or sensor that detects electromagnetic radiation that is reflected, scattered, absorbed, transmitted, or emitted by the object. In some embodiments, the machine vision system is configured as a visible light-based system used for measurement of object dimensions. In some embodiments, the machine vision system is configured as a visible light-based system used for measurement of object surface finish. In some embodiments, the machine vision system is configured as an infrared-based system used for measurement of object temperature or heat flux within the object. In some embodiments, the machine vision system is configured as an X-ray diffraction-based system used for measurement of object material properties. In some embodiments, the one or more process control parameters to be predicted or adjusted comprise a rate of material deposition, a rate of displacement for a deposition apparatus, a rate of acceleration for a deposition apparatus, a direction of displacement for a deposition apparatus, an angle of a deposition apparatus with respect to a deposition direction, an intensity of heat flux into a material during deposition, a size and shape of a heat flux surface, a flow rate and angle of shielding gas flow, a temperature of a deposition apparatus, an ambient temperature control during a deposition process, a temperature of a deposition material prior to deposition, a current or voltage setting in a resistive heating apparatus, a voltage frequency or amplitude in an inductive heating apparatus, a choice of deposition material, a ratio by volume or a ratio by weight of deposition materials if more than one deposition material is used, or any combination thereof. In some embodiments, the machine learning algorithm comprises a supervised learning algorithm, an unsupervised learning algorithm, a semi-supervised learning algorithm, a reinforcement learning algorithm, a deep learning algorithm, or any combination thereof. In some embodiments, the machine learning algorithm comprises an artificial neural network. In some embodiments, the artificial neural network comprises an input layer, an output layer, and at least 5 hidden layer. In some embodiments, the number of nodes in the input layer is at least 100. In some embodiments, at least one stream of real-time process characterization data is provided to the machine learning algorithm at a rate of at least 100 Hz. In some embodiments, the one or more process control parameters are adjusted at a rate of at least 100 Hz.

Disclosed herein are methods for automated classification of object defects, the methods comprising: a) providing a training data set, wherein the training data set comprises fabrication process simulation data, fabrication process characterization data, in-process inspection data, post-build inspection data, or any combination thereof, for a plurality of design geometries that are the same as or different from that of the object; b) providing one or more sensors, wherein the one or more sensors provide real-time data for one or more object properties; c) providing a processor programmed to provide a classification of detected object defects using a machine learning algorithm that has been trained using the training data set of step (a), wherein the real-time data from the one or more sensors is provided as input to the machine learning algorithm and allows the classification of detected object defects to be adjusted in real-time.

In some embodiments, the method further comprises removing noise from the object property data provided by the one or more sensors prior to providing it to the machine learning algorithm. In some embodiments, noise is removed from the object property data using a signal averaging algorithm, smoothing filter algorithm, Kalman filter algorithm, nonlinear filter algorithm, total variation minimization algorithm, or any combination thereof. In some embodiments, the one or more sensors provide data on electromagnetic radiation that is reflected, scattered, absorbed, transmitted, or emitted by the object. In some embodiments, the one or more sensors comprise image sensors or machine vision systems. In some embodiments, the electromagnetic radiation is ultraviolet, visible, or infrared light. In some embodiments, the one or more sensors provide data on acoustic energy or mechanical energy that is reflected, scattered, absorbed, transmitted, or emitted by the object. In some embodiments, subtraction of a reference data set is used to increase contrast between normal and defective features of the object. In some embodiments, the one or more sensors provide data on an electrical conductivity or a thermal conductivity of the object. In some embodiments, the machine learning algorithm comprises a supervised learning algorithm, an unsupervised learning algorithm, a semi-supervised learning algorithm, a reinforcement learning algorithm, a deep learning algorithm, or any combination thereof. In some embodiments, at least one of the one or more sensors provide data as input to the machine learning algorithm at a rate of at least 100 Hz. In some embodiments, the classification of detected object defects is adjusted at a rate of at least 100 Hz. In some embodiments, the object defects that are detected are classified using a support vector machine (SVM), artificial neural network (ANN), or decision tree-based expert learning system. In some embodiments, the object defects are detected as differences between object property data and a reference data set that are larger than a specified threshold, and are classified using a one-class support vector machine (SVM) or autoencoder algorithm. In some embodiments, the object defects are detected and classified using an unsupervised one-class support vector machine (SVM), autoencoder, clustering, or nearest neighbor (kNN) machine learning algorithm and a training data set that comprises object property data for defective and defect-free objects.

INCORPORATION BY REFERENCE

All publications, patents, and patent applications mentioned in this specification are herein incorporated by reference in their entirety to the same extent as if each individual publication, patent, or patent application was specifically and individually indicated to be incorporated by reference in its entirety. In the event of a conflict between a term herein and a term in an incorporated reference, the term herein controls.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 3A-C provide schematic illustrations of the conversion of a CAD design for a three-dimensional object to a continuous, spiral wound "two-dimensional" layer (of finite thickness) and associated helical tool path (FIG. 3A), or a stacked series of "two-dimensional" layers and associated circular, layer-by-layer tool paths (FIG. 3B) for deposition of material using an additive manufacturing process. FIG. 3C: illustration of the tool path for a robotically manipulated deposition tool and simulation of the resulting object fabricated using an additive manufacturing process.

FIG. 4A: isometric view of color-encoded three dimensional FEA simulation data for the liquid fraction of material in the melt pool being deposited by a laser-metal wire deposition process. FIG. 4B: cross-sectional view of the FEA simulation data for the liquid fraction of material in the melt pool. FIG. 4C: cross-sectional view of color-encoded three dimensional FEA simulation data for the static temperature of the material in the melt pool.

FIG. 6A: schematic illustration of laser beams used to probe the geometry of the wire feed and melt pool overlaid with a photo of a laser-metal wire deposition process. FIG. 6B: cross-sectional profiles (i.e., height profiles across the width of the deposition) of the wire feed (solid line; peak) and previously deposited layer (solid line; shoulders) and resulting melt pool (dashed line). The x-axis (width) dimension is plotted in arbitrary units. The y-axis (height) dimension is plotted in units of millimeters relative to a fixed reference point below the deposition layer.

FIG. 7A: raw image stream obtained from machine vision system. FIG. 7B: processed image after de-noising, filtering, and edge detection algorithms have been applied. FIG. 7C: processed image after application of a feature extraction algorithm.

FIG. 16A: image of part after build process has been completed. FIG. 16B: post-build inspection output (CT scan). FIG. 16C: the CT scan image of FIG. 16B after automated feature extraction; automated feature extraction allows one to correlate part features with build-time actions.

DETAILED DESCRIPTION

Disclosed herein are methods for automated classification of object defects, for example, for objects fabricated using an additive manufacturing process or welding process, where the methods comprise: a) providing a training data set, wherein the training data set comprises fabrication process simulation data, fabrication process characterization data, in-process inspection data, post-build inspection data, or any combination thereof, for a plurality of object design geometries that are the same as or different from the object; b) providing one or more sensors, wherein the one or more sensors provide real-time data for one or more object properties; c) providing a processor programmed to provide a classification of detected object defects using a machine learning algorithm that has been trained using the training data set of step (a), wherein the real-time data from the one or more sensors is provided as input to the machine learning algorithm and allows the classification of detected object defects to be adjusted in real-time. Also disclosed are systems designed to perform automated classification of object defects.

Figure 1:
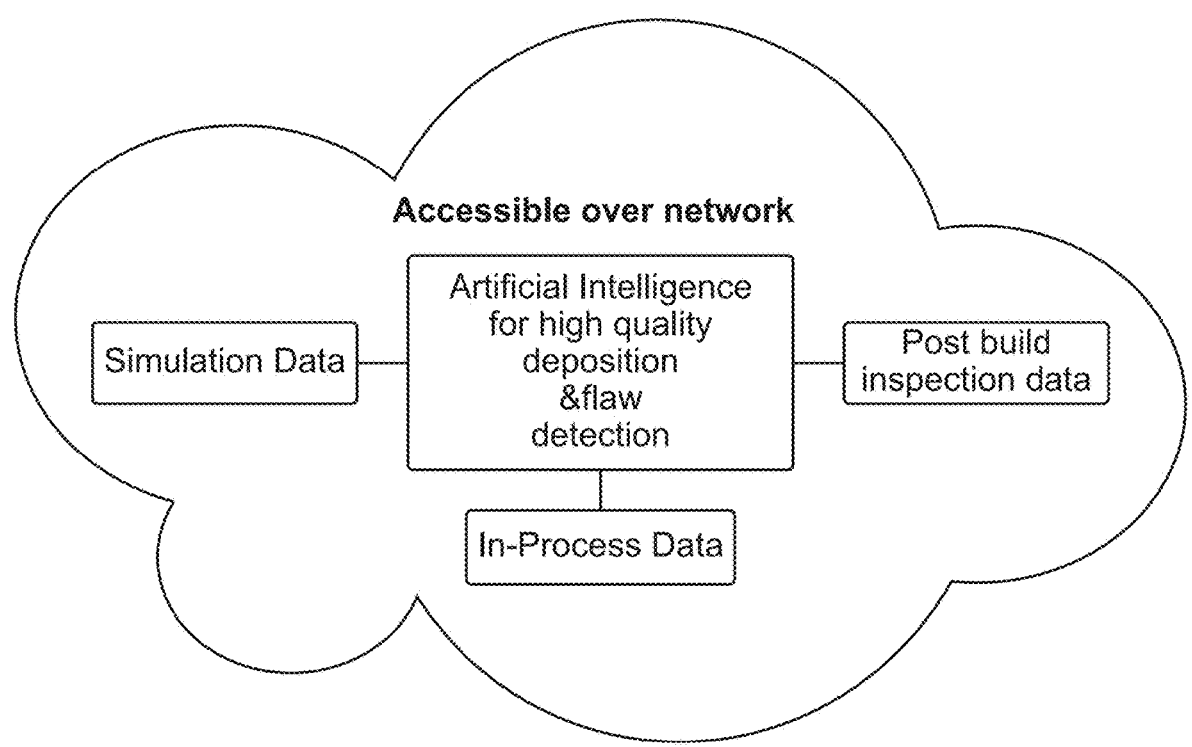
FIG. 1 provides a schematic illustration of a machine learning-based system for providing real-time adaptive control of free form deposition processes, e.g., additive manufacturing processes.

Disclosed herein are methods for real-time adaptive control of an additive manufacturing or welding process comprising: a) providing an input design geometry for an object; b) providing a training data set, wherein the training data set comprises process simulation data, process characterization data, in-process inspection data, post-build inspection data, or any combination thereof, for a plurality of design geometries that are the same as or different from the input design geometry of step (a) or any portion thereof; c) providing a predicted optimal set/sequence of one or more process control parameters for fabricating the object, wherein the predicted optimal set of one or more process control parameters are derived using a machine learning algorithm that has been trained using the training data set of step (b); and d) performing the additive manufacturing or welding process to fabricate the object, wherein real-time process characterization data is provided as input to the machine learning algorithm to adjust one or more process control parameters in real-time. Also disclosed are systems designed to implement these methods, as illustrated schematically in FIG. 1. As indicated in FIG. 1, in some embodiments, the disclosed methods for adaptive, real-time control of additive manufacturing or welding processes may be implemented using a distributed system, e.g., where different components or modules of the system are physically located in different workspaces, at different work sites, or in different geographical locations, and process simulation data, process characterization data, in-process inspection data, post-build inspection data, and/or adaptive process control instructions are shared and exchanged between locations by means of a telecommunications network or the internet.

As used herein, the terms "deposition process" and "free form deposition process" may refer to any of a variety of liquid-to-solid free form deposition processes, solid-to-solid free form deposition processes, additive manufacturing processes, welding processes, and the like. In some embodiments, the disclosed methods and systems may be applied to any of a variety of additive manufacturing processes, including, but not limited to, fused deposition modeling (FDM), selective laser sintering (SLS), or selective laser melting (SLM), as will be described in more detail below. In some preferred embodiments, the additive manufacturing process may comprise a liquid-to-solid free form deposition process, e.g., a laser-metal wire deposition process, or a welding process, e.g. a laser welding process.

In some embodiments, process simulation data may be incorporated into the training data set used by the machine learning algorithm that enables automated classification of object defects, prediction of optimal sets or sequences of process control parameters, adjustment of process control parameters in real-time, or any combination thereof. For example, process simulation tools such as finite element analysis (FEA) may be used to simulate the process for fabricating an object or a specific portion thereof, e.g., a feature, from any of a variety of fabrication materials as a function of a specified set of process control parameters. In some embodiments, process simulation tools may be used to predict an optimal set or sequence of process control parameters for fabricating a specified object or object feature.

In some embodiments, process characterization data may be incorporated into the training data set used by the machine learning algorithm that enables automated classification of object defects, prediction of optimal sets or sequences of process control parameters, adjustment of process control parameters in real-time, or any combination thereof. For example, process characterization data may be provided by any of a variety of sensors or machine vision systems, as will be described in more detail below. In some embodiments, process characterization data may be fed to the machine learning algorithm in order to update the process control parameters of an additive manufacturing apparatus in real-time.

In some embodiments, in-process or post-build inspection data may be incorporated into the training data set used by the machine learning algorithm that enables automated classification of object defects, prediction of optimal sets or sequences of process control parameters, adjustment of process control parameters in real-time, or any combination thereof. For example, in-process or post-build inspection data may include data from visual or machine vision-based measurements of object dimensions, surface finish, number of surface cracks or pores, etc., as will be described in more detail below. In some embodiments, in-process inspection data (e.g., automated defect classification data) may be used by the machine learning algorithm to determine a set or sequence of process control parameter adjustments that will implement a corrective action, e.g., to adjust a layer dimension or thickness, so as to correct the defect when first detected. In some embodiments, in-process inspection data (e.g., automated defect classification data) may be used by the machine learning algorithm to send a warning or error signal to an operator, or optionally, to automatically abort the deposition process, e.g., an additive manufacturing process.

In some embodiments, the training data set is updated with additional process simulation data, process characterization data, in-process inspection data, post-build inspection data, or any combination thereof, after each iteration of an additive manufacturing process that is performed iteratively. In some embodiments, the training data set further comprises process characterization data, in-process inspection data, post-build inspection data, or any combination thereof, that is generated by a skilled operator while manually setting the input process control parameters for an additive manufacturing process to produce a specified set of objects or parts, or while manually adjusting the process control parameters in response to changes in process parameters or environmental variables to maintain a specified quality of the objects or parts being produced. In some embodiments, the training data set may comprise process simulation data, process characterization data, in-process inspection data, post-build inspection data, or any combination thereof that is collected from a plurality of additive manufacturing apparatus operating serially or in parallel.

A variety of different machine learning algorithms known to those of skill in the art may be employed to implement the disclosed methods for automated object defect classification and adaptive control of additive manufacturing or welding processes. Examples include, but are not limited to, artificial neural network algorithms, Gaussian process regression algorithms, fuzzy logic-based algorithms, decision tree algorithms, etc., as will be described in more detail below. In some embodiments, more than one machine learning algorithm may be employed. For example, automated classification of object defects may be implemented using one type of machine learning algorithm, and adaptive real-time process control may be implemented using a different type of machine learning algorithm. In some embodiments, hybrid machine learning algorithms that comprise features and properties drawn from two, three, four, five, or more different types of machine learning algorithms may be employed to implement the disclosed methods and systems.

In some embodiments, the disclosed methods for automated classification of object defects and adaptive real-time control may be implemented using components, e.g., additive manufacturing and/or welding apparatus, process control monitors or sensors, machine vision systems, and/or post-build inspection tools, which are co-localized in a specific workspace and which have been integrated to form stand-alone, self-contained systems. In some embodiments, the disclosed methods may be implemented using modular components, e.g., additive manufacturing and/or welding apparatus, process control monitors or sensors, machine vision systems, and/or post-build inspection tools, that are distributed over different workspaces and/or different worksites, and that are linked via a local area network (LAN), an intranet, an extranet, or the internet so that process data (e.g., training data, process simulation data, process control data, and post-build inspection data) and process control instructions may be shared and exchanged between the different modules. In some embodiments, a plurality of additive manufacturing and/or welding apparatus are linked to the same distributed system so that process data is shared amongst two or more additive manufacturing and/or welding apparatus control systems, and used to update the training data set for the entire distributed system.

The disclosed methods and systems for automated object defect classification and adaptive real-time control of additive manufacturing and/or welding apparatus may provide for rapid optimization and adjustment of the process control parameters used in response to changes in process or environmental parameters, as well as improved process yield, process throughput, and quality of the parts that are produced. The methods and systems are applicable to parts fabrication in a variety of different technical fields and industries including, but not limited to, the automotive industry, the aeronautics industry, the medical device industry, the consumer electronics industry, etc.

Definitions

Unless otherwise defined, all technical terms used herein have the same meaning as commonly understood by one of ordinary skill in the art in the field to which this disclosure belongs. As used in this specification and the appended claims, the singular forms "a", "an", and "the" include plural references unless the context clearly dictates otherwise. Any reference to "or" herein is intended to encompass "and/or" unless otherwise stated.

As used herein, the term "free form deposition process" may refer to any of a variety of liquid-to-solid free form deposition processes, solid-to-solid free form deposition processes, additive manufacturing processes, welding processes, and the like.

As used herein, the term "joining process" may refer to any of a variety of welding processes.

As used herein, the term "data stream" refers to a continuous or discontinuous series or sequence of analog or digitally-encoded signals (e.g., voltage signals, current signals, image data comprising spatially-encoded light intensity and/or wavelength data, etc.) used to transmit or receive information.

As used herein, the term "process window" refers to a range of process control parameter values for which a specific manufacturing process yields a defined result. In some instances, a process window may be illustrated by a graph of process output plotted as a function of multiple process control parameters, with a central region indicating the range of parameter values for which the process behaves well, and outer borders that define regions where the process becomes unstable or returns an unfavorable result.

As used herein, the term "machine learning" refers to any of a variety of artificial intelligence or software algorithms used to perform supervised learning, unsupervised learning, reinforcement learning, or any combination thereof.

As used herein, the term "real-time" refers to the rate at which sensor data is acquired, processed, and/or used in a feedback loop with a machine learning algorithm to update a classification of object defects or to update a set or sequence of process control parameters in response to changes in one or more input process data streams comprising process simulation data, process characterization data, in-process inspection data, post-build inspection data, or any combination thereof.

Additive Manufacturing Processes:

The term "additive manufacturing" refers to a collection of versatile fabrication techniques for rapid prototyping and manufacturing of parts that allow 3D digital models (CAD designs) to be converted to three dimensional objects by depositing multiple thin layers of material according to a series of two dimensional, cross-sectional deposition maps. Additive manufacturing may also be referred to as "direct digital manufacturing", "solid free form fabrication", "liquid solid free form fabrication", or "3D printing", and may comprise deposition of material in a variety of different states including liquid, powder, and as fused material. A wide variety of materials can be processed using additive manufacturing methods, including metals, alloys, ceramics, polymers, composites, airy structures, and multi-phase materials. One of the main advantages of additive manufacturing processes is the reduced number of fabrication steps required to transform a virtual design into a ready-to-use (or nearly ready-to-use) part. Another major advantage is the ability to process complex shapes that are not easy to fabricate using conventional machining, extrusion, or molding techniques.

Specific examples of additive manufacturing techniques to which the disclosed object defect classification and adaptive process control methods may be applied include, but are not limited to, stereolithography (SLA), digital light processing (DLP), fused deposition modeling (FDM), selective laser sintering (SLS), selective laser melting (SLM), or electronic beam melting (EBM) processes.

Stereolithography (SLA): In stereolithography, a tank of liquid ultraviolet curable resin is used in combination with a scanned laser beam to cure one thin layer of resin at a time according to a two-dimensional exposure pattern. When one layer is done, the bed or base that it was cured on is lowered slightly into the tank and another layer is cured. The build platform repeats the cycle of layer curing and downward steps until the part is complete. The amount of time required for each cycle of the process depends on the cross-sectional area of the part and the spatial resolution required. By the time that the part is complete, it is completely submerged in the uncured resin. It is then pulled from the tank and may optionally be further cured in an ultraviolet oven.

Digital Light Processing (DLP): Digital light processing is a variation of stereolithography in which a vat of liquid polymer is exposed to light from a DLP projector (e.g., which uses one or more digital micromirror array devices) under safelight conditions. The DLP projector projects the image of a 3D model onto the liquid polymer. The exposed liquid polymer hardens and the build plate moves down and the liquid polymer is once more exposed to light. The process is repeated until the 3D object is complete and the vat is drained of liquid, revealing the solidified model. DLP 3D printing is fast and may print objects with a higher resolution than some other techniques.

Fused Deposition Modeling (FDM): Fused deposition modeling is one of the most common forms of 3D printing, and is sometimes also called Fused Filament Fabrication (FFF). FDM printers can print in a variety of plastics or polymers, and typically print with a support material. FDM printers use extruder heads that super heat the input plastic filament so that it becomes a liquid, and then push the material out in a thin layer to slowly fabricate an object in a layer-by-layer process.

Selective Laser Sintering (SLS): Selective uses a laser to fuse material together layer by layer. A layer of powder is pushed onto the build platform and heated by a laser (and sometimes also compressed) so that it fuses without passing through a liquid state. Once that is done, another layer of powder is applied and heated again. The process requires no support material as the leftover material holds it upright. After the part is complete, one removes it from the powder bed and clean off any excess material.

Selective Laser Melting (SLM): Selective laser melting is a variation of selective laser sintering and direct metal laser sintering (DMLS) (Yap, et al. (2015), "Review of Selective Laser Melting: Materials and Applications", Applied Physics Reviews 2:041101). A high power laser is used to melt and fuse metallic powders. A part is built by selectively melting and fusing powders within and between layers. The technique is a direct write technique, and has been proven to produce near net-shape parts (i.e., fabricated parts that are very close to the final (net) shape, thereby reducing the need for surface finishing and greatly reducing production costs) with up to 99.9% relative density. This enables the process to build near full density functional parts. Recent developments in the fields of fiber optics and high-powered lasers have also enabled SLM to process different metallic materials, such as copper, aluminium, and tungsten, and has opened up research opportunities in SLM of ceramic and composite materials.

Electronic Beam Melting (EBM): Electron beam melting is an additive manufacturing technique, similar to selective laser melting. EBM technology fabricates parts by melting metal powder layer by layer with an electron beam under high vacuum. In contrast to sintering techniques, both EBM and SLM achieve full melting of the metal powder. This powder bed method produces fully dense metal parts directly from a metal powder which have the characteristics of the target material. The EBM deposition apparatus reads data from a 3D CAD model and lays down successive layers of powdered material. These layers are melted together utilizing a computer controlled electron beam to build parts layer by layer. The process takes place under vacuum, which makes it suitable for the manufacture of parts using reactive materials with a high affinity for oxygen, e.g., titanium. The process operates at higher temperatures than many other techniques (up to 1000° C.), which can lead to differences in phase formation though solidification and solid state phase transformation. The powder feedstock is typically pre-alloyed, as opposed to being a mixture. Compared to SLM and DMLS, EBM generally has a faster build rate because of its higher energy density and scanning method.

Figure 2:
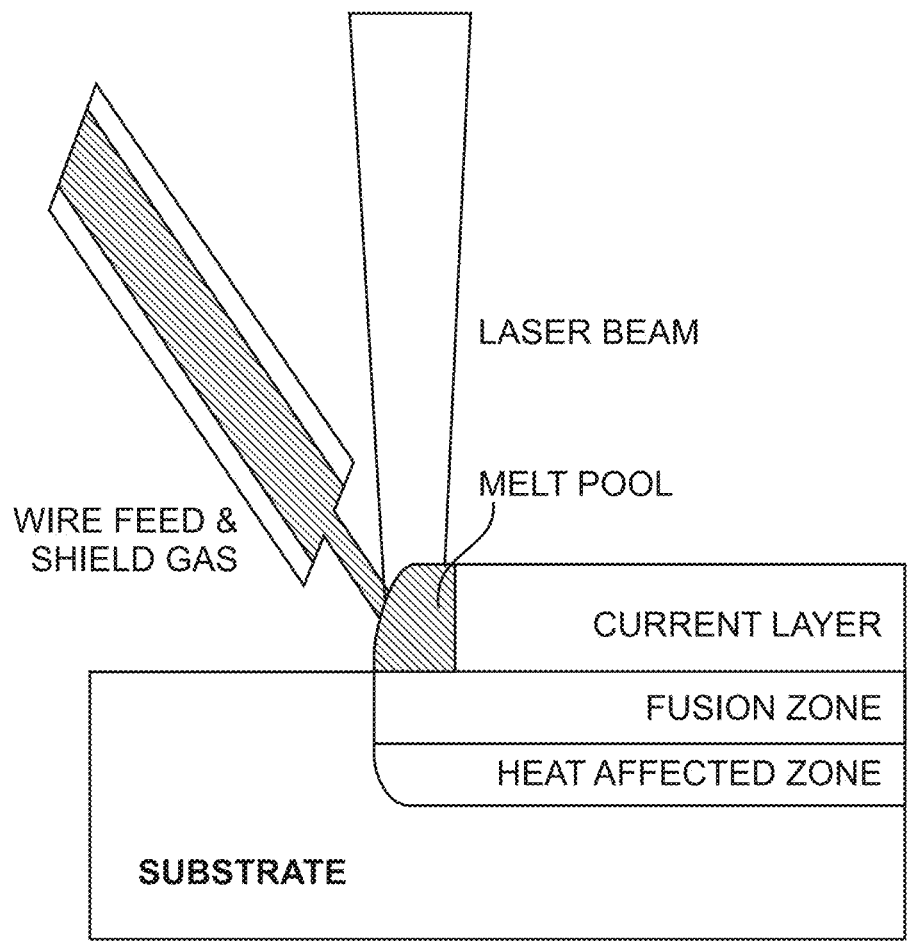
FIG. 2 is a schematic diagram of an example set-up for a material deposition process, e.g., a laser-metal wire deposition process, according to some embodiments of the present disclosure.

Laser-Metal Wire Deposition:

In one preferred embodiment, the additive manufacturing processes and systems to which the disclosed defect classification and adaptive control methods may be applied is laser-metal wire deposition. The central process in laser-metal wire deposition is the generation of beads of deposited material (a plurality of which may be required to form a single layer) using a high power laser source and additive material in the form of metal wire (Heralić (2012), Monitoring and Control of Robotized Laser Metal-Wire Deposition, Ph.D. Thesis, Department of Signals and Systems, Chalmers University of Technology, Goteborg, Sweden). The laser generates a melt pool on the substrate material, into which the metal wire is fed and melted, forming a metallurgical bound with the substrate. By moving the laser processing head and the wire feeder, i.e., the deposition (or welding) tool, relative to the substrate a bead is formed during solidification. The relative motion of the deposition tool and the substrate may be controlled, for example, using a 6-axis industrial robot arm. The formation of a deposited layer is illustrated in FIG. 2, as will be described in more detail below.

Prior to beginning deposition, a set of process parameters typically needs to be chosen and the equipment needs to be adjusted accordingly. Important process control parameters for laser-metal wire deposition include the laser power setting, the wire feed rate, and the traverse speed. These control the energy input, the deposition rate and the cross-section profile of the layer being deposited, i.e., the width and the height of the layer. The height (or thickness) of the deposited layer is determined by the amount of wire that is fed into the melt pool in relation to the traverse speed and the laser power. Once the nominal laser power, traverse speed, and the wire feed rate have been specified, there may be additional parameters to set, e.g., the relative orientation of the wire feed to the laser beam and substrate for a given traverse speed. Careful adjustment of these parameters is necessary in order to attain stable deposition on a flat surface.

Examples of the process control parameters that may need to be considered in order to achieve stable deposition of uniform beads of material on a flat surface include, but are not limited to:

Laser Power: one of the main process control parameters, the laser power setting determines the maximum energy input. Depending on the laser beam size and the traverse speed, laser power also controls the melt pool size and consequently the width of the deposited bead.

Laser Power Distribution: affects the melt pool dynamics. Non-limiting examples of different laser power (or beam profile) distributions include step-function and Gaussian distributions.

Laser/Wire or Laser/Substrate Angle: affect the process window and the true energy input. The angle between the laser beam and the wire feed impacts the sensitivity of the deposition process to changes in wire feed rate and variations in distance between the wire nozzle and the substrate. The angle between the laser beam and the substrate impacts the reflection of the laser beam from the substrate surface, and hence the amount of absorbed energy.

Laser Beam Size and Shape: control the size and the shape of the melt pool (together with the laser power and the traverse speed). The use of a circular beam shape is common, although rectangular shapes are being used as well (e.g., with diode lasers). The size is chosen to reflect the desired bead width.

Laser Beam Focal Length: controls how collimated the laser beam is at the substrate surface. Consequently, it impacts the sensitivity of the deposition process to distance variations between the focus lens and the substrate.

Laser Wavelength: controls the absorbance of the laser beam by the deposited material. For metals, the absorbance of laser light varies with wavelength (and specific materials).

Wire feed rate: another one of the main process control parameters, the wire feed rate impacts the amount of mass deposited per unit time. The wire feed rate primarily impacts the bead height, and needs to be chosen in relation to the laser power and the traverse speed.

Wire diameter: should be chosen in relation to the laser beam size to ensure proper melting and a flexible process.

Wire/Substrate Angle: affects the melting of the wire and thereby also the stability of the deposition process. Under proper conditions, the transfer of metal between the wire and the melt pool is smooth and continuous. Use of an improper wire/substrate angle may cause the metal transfer process to result in either globular deposition, e.g., as a series of droplets on the substrate surface, or the wire may still be solid as it enters the melt pool. Use of a higher angle reduces sensitivity to deposition direction, but at the same time results in a smaller process window of allowable wire feed rates.

Wire Tip Position Relative to the Melt Pool: also affects the melting rate of the wire and thereby the stability of the process.

Wire stick-out: typically not as critical as the wire angle or the wire tip position, but the stick-out distance may need to be adjusted depending on the expected deposition conditions. It primarily affects the sensitivity of the process to variations in height between the wire nozzle and the substrate.

Shield Gas: use of a shield gas may impact the degree to which contaminants and/or defects are introduced into the deposition layer. Composition, flow rate, and/or angle of incidence may be adjusted in some embodiments.

Feed Direction: determines from which direction the wire enters the melt pool, and thereby affects the melting of the wire, and thus the metal transfer process. Different choices of feed direction change the range of allowed wire feed rates that may be used. In some cases it can also affect the shape of the deposited bead.

Traverse Speed: another one of the main process control parameters, the traverse speed impacts the amount of material deposited per unit length and the input energy per unit length. At lower traverse speeds the deposition process is typically more stable, unless the temperature of the deposited material becomes too high. At high traverse speeds, lower energy inputs can be obtained for the same amount of material deposited per unit length. However, the motion control system's acceleration and path accuracy become more critical.

Process Stability: Proper tuning of the process control parameters described above influences the rate of transfer of metal between the solid wire and the melt pool, which is important for the stability of the deposition process. In general, there are three ways that the metal wire can be deposited: by globular (droplet-like) transfer, smooth transfer, or by plunging (i.e., incomplete melting of the wire prior to entering the melt pool). Only smooth transfer results in a stable deposition process.

If the deposition apparatus is set-up so that the wire tip spends too much time in the laser beam (e.g., by choosing a feed angle that is too high in relation to the other process control parameters), it will reach the melting temperature somewhere prior to entering the melt pool. The transfer of metal between the solid wire and the melt pool might then be stretched to a point where surface tension can no longer maintain the flow of metal, resulting in the formation and separation of surface tension-induced spherical droplets. This type of deposition gives rise to highly irregular bead shapes and a poor deposition process. Once globular transfer starts, it is typically hard to abort. The physical contact between the molten wire tip and the melt pool must be re-established, and the process control parameters must be adjusted to appropriate values.

Alternatively, if the wire feed angle is carefully adjusted so that the wire is melted close to the intersection with the melt pool, there will be a smooth transfer of metal from the solid wire to the liquid metal of the melt pool. The resulting beads of deposited metal will have a smooth surface and a stable metallurgical bond to the substrate.

Another way to melt the wire is by heat conduction from the melt pool, i.e., by plunging the wire into the melt pool. Precautions must be taken to adjust the wire feed rate to a value sufficiently low relative to the melting rate provided by the heat energy in the melt pool that the wire melts completely. Incomplete melting can result in, for example, lack of fusion (LOF) defects. Note that LOF defects may occur even at low wire feed rates for which the resulting beads are more or less indistinguishable from normal bead depositions.

Adjustment of Process Parameters: The process control parameters described above are adjusted depending on the choice of material and the energy input required to melt the material, which in turn is determined based on the desired deposition rate, deformation restrictions, the material's viscosity, and the available laser power and beam spot sizes. These factors put a requirement on the laser power, the traverse speed, and the wire feed rate settings. The laser beam should preferably be as orthogonal to the melt pool as possible to minimize reflection while avoiding back reflection into the optical system. The wire tip position relative to the melt pool should be adjusted with regard to the chosen amount of material deposited per time unit. If a front feed configuration is used and the deposition rate is low, the wire should enter the melt pool closer to the leading edge. Changing this parameter mainly affects the maximum and minimum wire feed rate for the chosen laser power and traverse speed. A closely related parameter to the wire tip position is the wire/substrate angle. If the angle is low, high wire feed rates might be possible since plunging can be exploited in a better way. However, for extreme wire feed rates, only front feeding is feasible. This then limits the choice of complex deposition paths, such as zig-zag or spiral patterns. To decrease the sensitivity of the deposition process to feed direction and thereby allow for arbitrary deposition patterns, the angle between the wire and the substrate should be increased. However, increased flexibility in terms of allowable deposition patterns is often achieved at the cost of a smaller process window.

Multi-Layered Deposition: Obtaining stable deposition of a single bead of material on a flat substrate requires careful adjustment of the process control parameters, as discussed above. Ultimately, however, the goal is to deposit three-dimensional parts, i.e., to deposit several adjacent beads in a layer, and to repeat the deposition for a number of layers. The transition from deposition of a single bead to deposition of a three-dimensional part is often not straightforward. The precise shape of the individual layers are influenced by several additional factors, e.g., the deposition pattern, the distance between adjacent beads, and the motion control system's speed and path accuracy. The relationship between these factors and their impact of the resulting layer are complex and hard to predict, which complicates the adjustment of process control parameters required to achieve a given deposition design feature, e.g., the layer height. Another example of a factor that complicates the deposition of three-dimensional parts is the potential increase in local temperature of the part due to heat accumulation, which needs to be considered during multi-layered deposition. Heat may be accumulated in the deposited part, for example, due to the use of overly short pauses between deposition of adjacent layers.

The additional uncertainties that arise in three-dimensional deposition may create a problem from a process stability point of view. For example, if the estimate of layer height to be achieved is incorrect, the relationship between the wire tip and the substrate will be different from what was expected for the process parameters as originally set. As a result, the deposition process might transition from a smooth transfer of the molten wire to either a globular deposition mode or a wire plunging mode. Consequently, as long as the deposition process is not sufficiently understood and/or tightly controlled that the dimensions of the individual layers can be accurately predicted, three-dimensional deposition may require continuous on-line monitoring and/or process control parameter adjustment.

Difficulties in Optimizing Additive Manufacturing Processes:

Some of the difficulties discussed above in the context of laser-metal wire deposition are also applicable to other additive manufacturing processes (Guessasma, et al., (2015) "Challenges of Additive Manufacturing Technologies from an Optimisation Perspective", Int. J. Simul. Multisci. Des. Optim. 6, A9). Generation of the toolpaths from three-dimensional CAD models represents the first challenge. Most additive manufacturing technologies rely on a successive layer-by-layer fabrication process, so starting from a three-dimensional representation of the part (i.e., a tessellated version of the part's actual surface) and ending with a two-dimensional build strategy may introduce errors. The problem is particularly prevalent in droplet-based 3D printing approaches, as discontinuities in the fused material may appear in all build directions as a result of the layer-by-layer deposition process, and may lead to dimensional inaccuracy, unacceptable finish state, and structural and mechanical anisotropies. Anisotropy may also arise in the development of particular grain texture, for example, in laser melting deposition or arc welding of metals. Reduction of anisotropy may sometimes be achieved by selecting the appropriate build orientation of the virtual design.

In addition, the differences between a virtual design and the as-fabricated object may sometimes be significant due to the finite spatial resolution available with the additive manufacturing tooling used, or due to part shrinkage during solidification of the deposited material, which can cause both changes in dimension as well as deformation of the part. Consider, for example, fused deposition modelling for which the toolpath comprises a collection of filament paths of finite dimension. This has three main consequences on the fabricated object: (i) internal structural features may not be well captured depending on their size; (ii) discontinuities may appear depending on local curvature; and (iii) the surface finish state may be limited due to rough profiles arising from the fusing of multiple filaments.

One consequence of the discontinuous fabrication process and other issues related to additive manufacturing process errors is porosity. Many technical publications have been directed to the evaluation of the effect of porosity in printed parts. One particular consequence is that porosity may reduce the mechanical performance of the part, e.g., through a decrease of stiffness with increased porosity level, or through lower mechanical strength under tension because of the development of porosity-enhanced damage in the form of micro-cracks. It should be noted that porosity may not always be viewed as a negative consequence of additive manufacturing processes, as it can be used, for example, to increase permeability in some applications.

Another type of defect encountered with some additive manufacturing processes is the presence of support material trapped between internal surfaces. Support material is sometimes needed to reinforce fragile printed structures during the printing process. Although these materials are typically selected to exhibit limited adhesion to the deposited materials, incomplete removal resulting in residual amounts of support material in the part may contribute to, for example, increased weight of the part and a modified load bearing distribution, which in turn may alter the performance of the part relative to that expected based on the original design. In addition, non-optimized support deposition may affect the finish state of the part, material consumption, fabrication time, etc. Various strategies have been described in the literature to reduce the dependence of additive manufacturing processes on the use of support materials. The strategies may vary depending on the geometry of the part and the choice of material to be deposited.

Welding Processes:

In some embodiments, the disclosed defect classification and process control methods and systems may be applied to welding processes and apparatus instead of, or in combination with, additive manufacturing processes and apparatus. Examples of welding processes and apparatus that may be employed with the disclosed process control methods and systems include, but are not limited to, laser beam welding processes and apparatus, MIG (metal inert gas) welding processes and apparatus (also referred to as gas metal arc welding), TIG (tungsten inert gas) welding processes and apparatus, and the like.

Laser Beam Welding (LBW): a welding technique used to join metal components that need to be joined with high welding speeds, thin and small weld seams and low thermal distortion. The laser beam provides a focused heat source, allowing for narrow, deep welds and high welding rates. The high welding speeds, automated operation, and capability to implement feedback control of weld quality during the process make laser welding a common joining method in modern industrial production. Examples of automated, high volume applications include use in the automotive industry for welding car bodies. Other applications include the welding of fine, non-porous seams in medical technology, precision spot welding in the electronics or jewelry industries, and welding in tool and mold-making.

MIG Welding: an arc welding process in which a continuous solid wire electrode is fed through a welding gun and into the weld pool, joining the two base materials together. A shielding gas is also sent through the welding gun and protects the weld pool from contamination, hence the name "metal inert gas" (MIG) welding. MIG welding is typically used to join thin to medium thick sheets of metal.

TIG Welding: TIG welding (technically called gas tungsten arc welding (GTAW)) is a process that uses a non-consumable tungsten electrode to deliver the current to the welding arc. The tungsten and weld puddle are protected and cooled with an inert gas, typically argon. TIG welding typically produces a somewhat neater and more controlled weld than MIG welding.

Conversion of 3D CAD Files to Layers and Tool Paths:

Computer-Aided Design: The first step in a typical free form deposition process, such as an additive manufacturing process, is to create a three dimensional model of the object to be fabricated using a computer-aided design (CAD) software package. Any of a variety of commercially-available CAD software packages may be used including, but not limited to, SolidWorks (Dassault Systèmes SolidWorks Corporation, Waltham, Mass.), Autodesk Fusion 360 (Autodesk, Inc., San Rafael, Calif.), Autodesk Inventor (Autodesk, Inc., San Rafael, Calif.), PTC Creo Parametric (Needham, Mass.), and the like.

Conversion to STL File Format: Once the CAD model is completed, it is typically converted to the standard STL (stereolithography) file format (also known as the "standard triangle language" or "standard tessellation language" file format) that was originally developed by 3D Systems (Rock Hill, S.C.). This file format is supported by many other software packages and is widely used for rapid prototyping, 3D printing, and computer-aided manufacturing. STL files describe only the surface geometry of a three-dimensional object without any representation of color, texture or other common CAD model attributes. In an ASCII STL file, the CAD model is represented using triangular facets, which are described by the x-, y-, and z-coordinates of the three vertices (ordered according to the right-hand rule) and a unit vector to indicate the normal direction that points outside of the facet (Ding, et al. (2016), "Advanced Design for Additive Manufacturing: 3D Slicing and 2D Path Planning", Chapter 1 in *New Trends in 3D Printing*, I. Shishkovsky, Ed., Intech Open).

Slicing the STL Model to Create Layers: Once the STL file has been created unidirectional or multidirectional slicing algorithms are used to slice the STL model into a series of layers according to the build direction. Uniform slicing methods create layers having a constant thickness. The accuracy of additively manufactured parts may sometimes be improved by altering the layer thickness. Typically, the smaller the layer thickness, the higher the achieved accuracy will be. The material deposition rate is also highly relevant to the sliced layer thickness. Adaptive slicing approaches thus slice the STL model with a variable thickness. Based on the surface geometry of the model, this approach automatically adjusts the layer thickness to improve the accuracy of the fabricated part or to improve the build time.

As noted above, many additive manufacturing processes utilize slicing a 3D CAD model into a set of two-dimensional layers having either a constant or adaptive thickness, where the layers are stacked in a single build direction. However, when fabricating parts with complex shapes unidirectional slicing strategies are generally limited by the need to include support structures for fabrication of overhanging features. The need to deposit support structures results in longer build times, increased material waste, and increased (and sometimes costly) post-processing for the removal of the supports. Some additive manufacturing techniques are capable of depositing material along multiple build directions. The use of multi-directional deposition helps to eliminate or significantly decrease the requirement for support structures in the fabrication of complex objects. A key challenge in multi-directional additive manufacturing is to develop robust algorithms capable of automatically slicing any 3D model into a set of layers which satisfy the requirements of support-less and collision-free layered deposition. A number of strategies for achieving this have been described in the technical literature (Ding, et al. (2016), "Advanced Design for Additive Manufacturing: 3D Slicing and 2D Path Planning", Chapter 1 in *New Trends in 3D Printing*, I. Shishkovsky, Ed., Intech Open).

Tool Path Planning: Another important step in free form deposition or additive manufacturing is the development of tool path strategies based on the layers identified by the slicing algorithm. Tool path planning for powder-based additive manufacturing processes that utilize fine, statistically-distributed particles is somewhat independent of geometric complexity. However, tool path planning for additive manufacturing processes that utilize larger, sometimes coarse beads of deposited material may be directly influenced by geometric complexity. In addition, the properties of the deposited material (height and width of the bead, surface finish, etc.) may be influenced by the deposition tool path trajectory. A variety of tool path planning strategies have been described in the technical literature including, but not limited to, the use of raster tool paths, zigzag tool paths, contour tool paths, tool paths, hybrid tool paths, continuous tool paths, hybrid and continuous tool paths, medial axis transformation (MAT) tool paths, and adaptive MAT tool paths.

Raster Tool Paths: The raster scanning tool path technique is based on planar ray casting along one direction. Using this tool path approach, two-dimensional regions of a given layer are filled in by depositing a set of material beads having finite width. Commonly employed in commercial additive manufacturing systems, it features simple implementation and is suitable for use with almost any arbitrary boundary.

Zigzag Tool Paths: Derived from the raster approach, zigzag tool path generation is the most popular method used in commercial additive manufacturing systems. Compared to the raster approach, the zigzag approach significantly reduces the number of tool path passes (and hence the build time) required to fill in the geometry line-by-line by combining the separate parallel lines into a single continuous zigzag pass. As with the raster tool path approach, the outline accuracy of the part is sometimes poor due to discretization errors on any edge that is not parallel to the tool motion direction.

Contour Tool Paths: Contour tool paths, another frequently used tool path method, help address the geometrical outline accuracy issue noted above by following the part's boundary contours. Various contour map patterns have been described in the literature for developing optimal tool path patterns for parts comprising primarily convex shapes that may also include openings or 'islands" (isolated sections of a model within a given layer).

Spiral Tool Paths: Spiral tool paths have been widely applied in computer numerically controlled (CNC) machining, e.g., for two-dimensional pocket milling (i.e., removal of material inside of an arbitrarily closed boundary on a flat surface of a work piece to a specified depth). This method can also be used with additive manufacturing processes to overcome the boundary problems of zigzag tool paths, but is typically only suitable for certain special geometrical models.

Hybrid Tool Paths: Hybrid tool paths share some of the features of more than one approach. For example, a combination of contour and zigzag tool path patterns is sometimes developed to meet both the geometrical accuracy requirements of a part and to improve the overall build efficiency.

Continuous Tool Paths: The goal of continuous tool path approaches is to fill in a deposition layer using one continuous path, i.e., a tool path that is capable of filling in an entire region without intersecting itself. This approach has been found to be particularly useful in reducing shrinkage during some additive manufacturing fabrication processes. However, the approach often necessitates frequent changes in path direction that may not be suitable for some deposition processes. Furthermore, when the area to be filled is large and the accuracy requirement is high, the processing time required may be unacceptably long. In addition, highly convoluted tool paths may result in excess accumulation of heat in certain regions of the part, thereby inducing unacceptable distortion of the part.

Hybrid Continuous Tool Paths: Tool path strategies have been developed which combine the merits of zigzag and continuous tool path patterns. In these approaches, the two-dimensional geometry is first decomposed into a set of monotone polygons. For each monotone polygon, a closed zigzag curve is then generated. Finally, a set of closed zigzag curves are combined together into an integrated continuous tortuous path. Recently, another continuous path pattern which combines the advantages of zigzag, contour, and continuous tool path patterns has been developed.

Medial Axis Transformation (MAT) Tool Paths: An alternative methodology for generating tool paths uses the medial axis transformation (MAT) of the part geometry to generate offset curves by starting at the inside and working toward the outside, instead of starting from the layer boundary and filling toward the inside. The medial axis of an object is the set of all points having more than one closest point on the object's boundary. In two dimensions, for example, the medial axis of a subset S of circles which are bounded by planar curve C is the locus of the centers of all circles within S that tangentially intersect with curve C at two or more points. The medial axis of a simple polygon is a tree-like skeleton whose branches are the vertices of the polygon. The medial axis together with an associated radius function of maximally inscribed circles is called the medial axis transform (MAT). The medial axis transform is a complete shape descriptor that can be used to reconstruct the shape of the original domain.

This approach is useful for computing tool paths which can entirely fill the interior region of the layer geometry, and avoids producing gaps by depositing excess material outside the boundary which can subsequently be removed through post-processing. Traditional contour tool path patterns which run from outside to inside are often used for machining, whereas MAT tool paths starting from the inside and working toward the outside are often more suitable for additive manufacture of void-free parts. The main steps for generating MAT-based tool paths are: (i) computation of the medial axis; (ii) decomposition of the geometry into one or more regions or domains, where each domain is bounded by a portion of the medial axis and a boundary loop; (iii) generation of the tool path for each domain by offsetting from the medial axis loop toward the corresponding boundary loop with an appropriate step-over distance. The offsetting is repeated until the domain is fully covered; and (iv) repeating step (iii) for each domain to generate a set of closed-loop paths, preferably without start/stop sequences. MAT path planning is frequently used, for example, with arc welding systems, and is particularly preferred for void-free additive manufacturing.

Adaptive MAT Tool Paths: Traditional contour tool paths frequently generate gaps or voids. MAT tool path planning was introduced to avoid generation of internal voids during deposition, and has been extended to handle complex geometries. As noted above, MAT tool paths are generated by offsetting the medial axis of the geometry from the center toward the layer boundary. Although MAT tool paths reduce the occurrence of internal voids, this is achieved at the cost of creating path discontinuities and extra material deposition at the layer boundary. Post-process machining to remove the extra materials and improve the dimensional accuracy of the part requires extra time and adds to the cost. For both traditional contour tool paths and MAT tool paths, the step-over distance, i.e., the distance between the next deposition path and the previous deposition path, is held constant. For some part geometries, it is not possible to achieve both high dimensional accuracy and void-free deposition using tool paths with constant step-over distance. However, some additive manufacturing processes, such as wire feed additive manufacturing processes, are capable of producing different deposited bead widths within a layer by varying process control parameters like travel speed and wire feed rate, while maintaining constant deposition height. Adaptive MAT tool path planning uses continuously varying step-over distances by adjusting the process parameters to deposit beads with variable width within a given tool path. Adaptive MAT path planning algorithms are able to automatically generate path patterns with varying step-over distances by analyzing the part geometry to achieve better part quality (void-free deposition), accuracy at the boundary, and efficient use of material.

Tool Path Generation Software: Examples of toolpath generation software include Repetier (Hot-World, GmbH, Germany) and CatalystEx (Stratasys Inc. Eden Prairie Minn., USA).

FIGS. 3A-C provide schematic illustrations of the conversion of a CAD design for a three-dimensional object to a continuous, spiral wound "two-dimensional" layer (of finite thickness) and associated helical tool path (FIG. 3A), or a stacked series of "two-dimensional" layers and associated circular, layer-by-layer tool paths (FIG. 3B) for deposition of material using an additive manufacturing process. FIG. 3C provides an illustration of the tool path for a robotically manipulated deposition tool and a simulation of the resulting object fabricated using an additive manufacturing process. Tool path and part simulation using a software package such as Octopuz (Jupiter, Fla.) is performed before running the deposition process on an actual deposition system. In some instances, the predicted optimal tool path may be locally modified during the deposition process in response to closed-loop feedback control. In some instances, the tool path may be reconstructed based on the as-built part geometry after the deposition process is complete.

Process Simulation Tools:

In some embodiments of the disclosed adaptive process control methods and systems, process simulation tools may be used to simulate the free form deposition process (or joining process) and/or to provide estimates of optimal sets (and/or sequences) of process control parameter settings (and adjustments). Any of a variety of process simulation tools known to those of skill in the art may be used including, but not limited to finite element analysis (FEA), finite volume analysis (FVA), finite difference analysis (FDA), computational fluid dynamics (CFD), and the like, or any combination thereof. In some embodiments of the disclosed methods and system, process simulation data from past fabrication runs is used as part of a training data set used to "teach" the machine learning algorithm used to run the process control.

Finite Element Analysis (FEA): Finite element analysis (also referred to as the finite element method (FEM)) is a numerical method for solving engineering and mathematical physics problems, e.g., for use in structural analysis, or studies of heat transfer, fluid flow, mass transport, and electromagnetic potential. Analytical solution of these types of problems generally requires the solution to boundary value problems involving partial differential equations, which may or may not solvable. The computerized finite element approach allows one to formulate the problem as a system of algebraic equations, the solution for which yields approximate values of the unknown parameters at a discrete number of points over the geometry or domain of interest. The problem to be solved is subdivided (discretized) into smaller, simpler components (i.e., the finite elements) to simplify the equations governing the behavior of the system. The relatively simple equations that model the individual finite elements are then assembled into a larger system of equations that models the entire problem. Numerical methods drawn from the calculus of variations are used to approximate a solution to the system of equations by minimizing an associated error function. FEA is often used for predicting how a product will react when subjected to real-world forces, e.g., stress (force per unit are or per unit length), vibration, heat, fluid flow, or other physical effects.

As noted above, in some embodiments of the disclosed adaptive process control methods, FEA may be used to simulate a deposition process and/or to provide estimates of optimal sets and/or sequences of process control parameter settings and adjustments thereof. Examples of deposition process parameters that may be estimated using FEA analysis (or other simulation techniques) include, but are not limited to, a prediction of a bulk or peak temperature of a deposited material, a cooling rate of a deposited material, a chemical composition of a deposited material, a segregation state of constituents in a deposited material, a geometrical property of a deposited material, an angle of overhang in a deposited geometry, an intensity of heat flux out of a material during deposition, an electromagnetic emission from a deposition material, an acoustic emission from a deposition material, or any combination thereof, as a function of a set of specified input process control parameters. Because the process control parameters used as input for the calculation may be adjusted to determine how they impact the simulated deposition process, iterative use of process simulation may be used to provide estimates of optimal sets and/or sequences of process control parameter settings and adjustments thereof.

Finite Volume Analysis (FVA): Finite volume analysis (also referred to as the finite volume method (FVM)) is another numerical technique related to finite element analysis that is used for solving partial differential equations, especially those that arise from physical conservation laws. FVM uses a volume integral formulation of the problem with a finite set of partitioning volumes to discretize the equations representing the original problem. FVA is, for example, commonly used for discretizing computational fluid dynamics equations.

Finite Difference Analysis (FDA): Finite difference analysis (also referred to as the finite difference method (FDM)) is another numerical method for solving differential equations by approximating them with difference equations, in which finite differences approximate the derivatives.

Computational Fluid Dynamics (CFD): Computational fluid dynamics refers to the use of applied mathematics, physics, and computational software (e.g. finite volume analysis software) to visualize how a gas or liquid flows in response to applied pressure, or to visualize how the gas or liquid affects objects as it flows past. Computational fluid dynamics is based on solution of Navier-Stokes equations, which describe how the velocity, pressure, temperature, and density of a moving fluid are related. CFD-based analysis is used in a variety of industries and applications, for example, computational fluid dynamics has been used to model predictive control for controlling melt temperature in plastic injection molding.

Figure 4B:
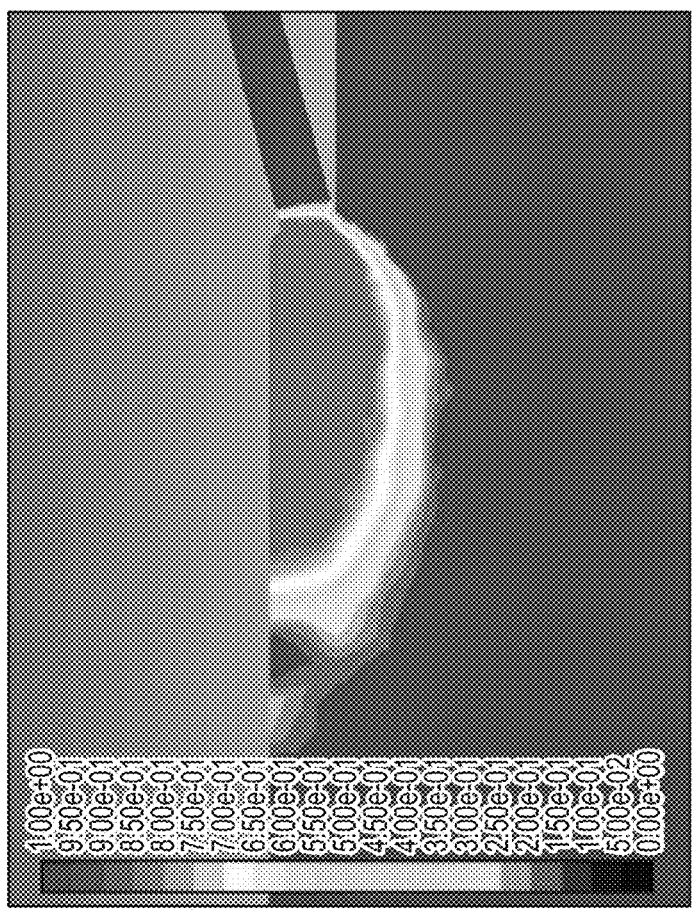
FIGS. 4A-C provide examples of FEA simulation data for modeling of a laser-metal wire deposition melt pool.
Figure 4A:
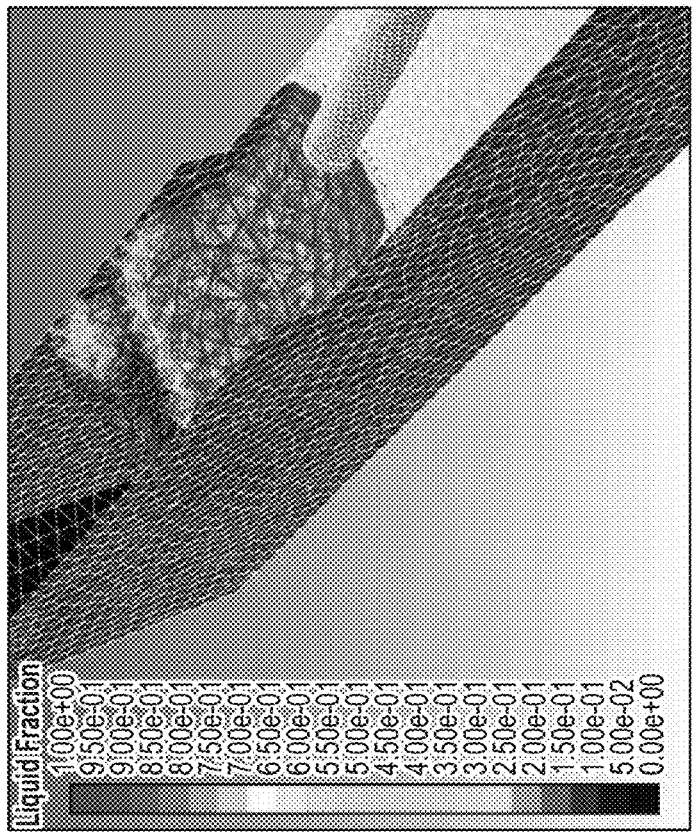
Figure 4C:
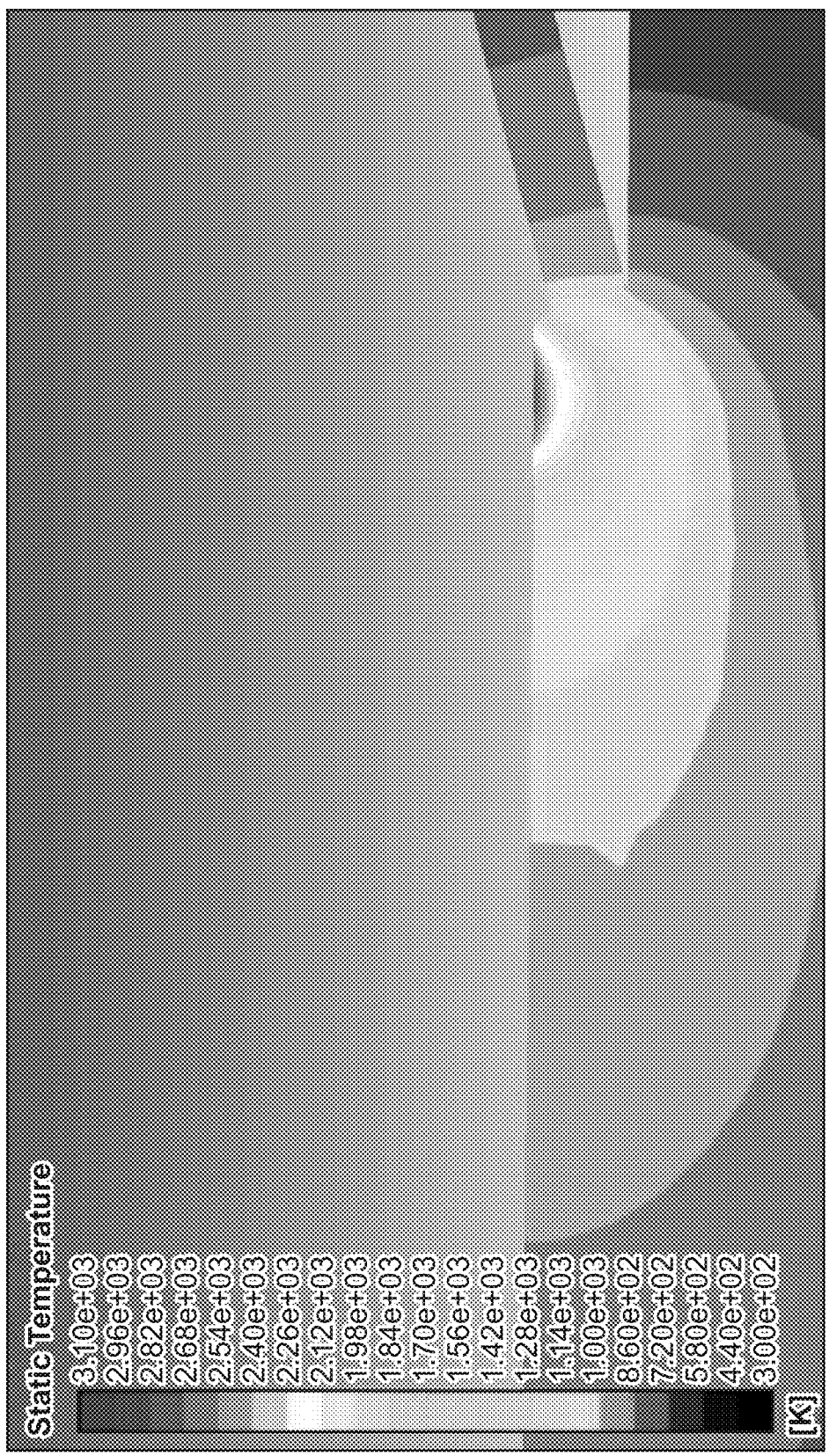

FIGS. 4A-C provide examples of FEA simulation data for modeling of a laser-metal wire deposition melt pool. FIG. 4A: isometric view of color-encoded three dimensional FEA simulation data for the liquid fraction of material in the melt pool being deposited by a laser-metal wire deposition process. The metal is in a completely liquid state at the position where the wire tip merges with the melt pool, and transitions to increasingly lower liquid fractions as it solidifies downstream from the position of the wire. FIG. 4B: cross-sectional view of the FEA simulation data for the liquid fraction of material in the melt pool. FIG. 4C: cross-sectional view of color-encoded three dimensional FEA simulation data for the static temperature of the material in the melt pool. The temperature is at a maximum value (approximately 2,900° K in this example) at the point where the laser beam impinges on the wire tip, and is asymmetrically distributed along the motion path of the deposition apparatus with higher temperatures exhibited by the material immediately downstream from the wire tip.

Process Control Parameters:

In some embodiments of the disclosed adaptive process control methods, one or more free form deposition process control parameters (or joining process control parameters) may be set and/or adjusted in real-time through the use of a machine learning algorithm that processes real-time deposition or welding process monitoring data, e.g., data from a machine vision system or laser interferometry measurement system, and uses that information to adjust the one or more process control parameters to improve the efficiency of the process and/or the quality of the part being fabricated.

In general, the types of process control parameters that may be set and/or adjusted by the adaptive process control system will vary depending on the specific type of free form deposition, additive manufacturing, or welding process being used. Examples of process control parameters that may be set and/or adjusted include, but are not limited to, the rate of material deposition, the rate of displacement for a deposition apparatus, the rate of acceleration for a deposition apparatus, the direction of displacement for a deposition apparatus, the location of a deposition apparatus as a function of time (i.e., a tool path), the angle of a deposition apparatus with respect to a deposition direction, the angle of overhang in an intended geometry, the intensity of heat flux into a material during deposition, the size and shape of a heat flux surface, the flow rate and angle of a shielding gas flow, the temperature of a baseplate on which material is deposited, the ambient temperature during a deposition process, the temperature of a deposition material prior to deposition, a current or voltage setting in a resistive heating apparatus, a voltage frequency or amplitude in an inductive heating apparatus, the choice of deposition material, the ratio by volume or the ratio by weight of deposition materials if more than one deposition material is used, or any combination thereof.

As indicated above, examples of process control parameters for a laser-metal wire deposition process that may be set and/or adjusted by the adaptive process control systems of the present disclosure include, but are not limited to, laser power, laser power distribution (or beam profile), laser/wire or laser/substrate angle, laser beam size and shape, laser beam focal length, laser wavelength, wire feed rate, wire diameter, wire/substrate angle, wire tip position relative to the melt pool, wire stick-out, shield gas settings, feed direction, and traverse speed.

In some embodiments of the disclosed adaptive process control methods and system, one or more process control parameters may be set and/or adjusted by the machine learning algorithm used to run the control process. In some embodiments, the number of different process control parameters to be set and/or adjusted may be at least 1, at least 2, at least 3, at least 4, at least 5, at least 10, at least 15, or at least 20. Those of skill in the art will recognize that the number of different process control parameters to be set and/or adjusted by the disclosed process control methods and systems may have any value within this range, e.g., 12 process control parameters.

Process Monitoring Tools:

In some embodiments of the disclosed adaptive process control methods and systems, one or more process monitoring tools may be used to provide real-time data on process parameters or properties of the object being fabricated, both of which will be referred to herein as "process characterization data". In some embodiments of the disclosed methods and system, process characterization data from past fabrication runs is used as part of a training data set used to "teach" the machine learning algorithm used to run the process control. In some embodiments, real-time (or "in-process") process characterization data is fed to the machine learning algorithm so that it may adaptively adjust one or more process control parameters in real-time.

Any of a variety of process monitoring tools known to those of skill in the art may be used including, but not limited to, temperature sensors, position sensors, motion sensors, touch/proximity sensors, accelerometers, profilometers, goniometers, image sensors and machine vision systems, electrical conductivity sensors, thermal conductivity sensors, strain gauges, durometers, X-ray diffraction or imaging devices, CT scanning devices, ultrasonic imaging devices, Eddy current sensor arrays, thermographs, deposition apparatus status indicators, or any combination thereof. In some embodiments, the process characterization sensors may comprise one or more sensors that detect electromagnetic radiation that is reflected, scattered, absorbed, transmitted, or emitted by the object. In some embodiments, the process characterization sensors may comprise one or more sensors that provide data on acoustic energy or mechanical energy that is reflected, scattered, absorbed, transmitted, or emitted by the object.

Any of a variety of process parameters may be monitored (i.e., to generate process characterization data) using appropriate sensors, measurement tools, and/or machine vision systems including, but not limited to, measurement of a bulk or peak temperature of a deposited material, a cooling rate of a deposited material, a chemical composition of a deposited material, a segregation state of constituents in a deposited material, a geometrical property of a deposited material (e.g., a local curvature of a printed part), a rate of material deposition, a rate of displacement for a deposition apparatus, a location (tool path) of a deposition apparatus, an angle of a deposition apparatus with respect to a deposition direction, a deposition apparatus status indicator, an angle of overhang in a deposited geometry, an angle of overhang in an intended geometry, an intensity of heat flux into a material during deposition, an intensity of heat flux out of a material during deposition, an electromagnetic emission from a deposition material, an acoustic emission from a deposition material, an electrical conductivity of a deposition material, a thermal conductivity of a deposition material, a defect in the geometry of an object being fabricated, or any combination thereof.

The disclosed methods and systems for adaptive process control may comprise the use of any number and any combination of sensors or process monitoring tools. For example, in some embodiments, an adaptive deposition process control system of the present disclosure may comprise at least 1, at least 2, at least 3, at least 4, at least 5, at least 6, at least 7, at least 8, at least 9, or at least 10 sensors or process monitoring tools. In some embodiments, the one or more sensors or process monitoring tools may provide data to the process control algorithm at an update rate of at least 0.1 Hz, 1 Hz, 5 Hz, 10 Hz, 20 Hz, 30 Hz, 40 Hz, 50 Hz, 60 Hz, 70 Hz, 80 Hz, 90 Hz, 100 HZ, 250 Hz, 500 Hz, 750 Hz, 1,000 Hz, 2,500 Hz, 5,000 Hz, 10,000 Hz, or higher. Those of skill in the art will recognize that the one or more sensors or process monitoring tools may provide data at an update rate having any value within this range, e.g., about 225 Hz.

Laser interferometry: One specific example of a free form deposition or joining process monitoring tool that may be used with, for example, a laser-metal wire deposition system is a laser interferometer for accurate, in-process measurement of part dimensions, refractive index changes, and/or surface irregularities. Laser light from a single source is split into two beams that follow separate optical paths until they are re-combined following the transmission or reflection of one of the beams by a sample, e.g., the part being fabricated, to produce interference. The resulting interference fringes provide precise information about the difference in optical path length for the two beams, and hence provide precise measurements of part dimensions, displacements, surface irregularities, etc. Interferometers are capable of measuring dimensions or displacements with nanometer precision.

Figure 5:
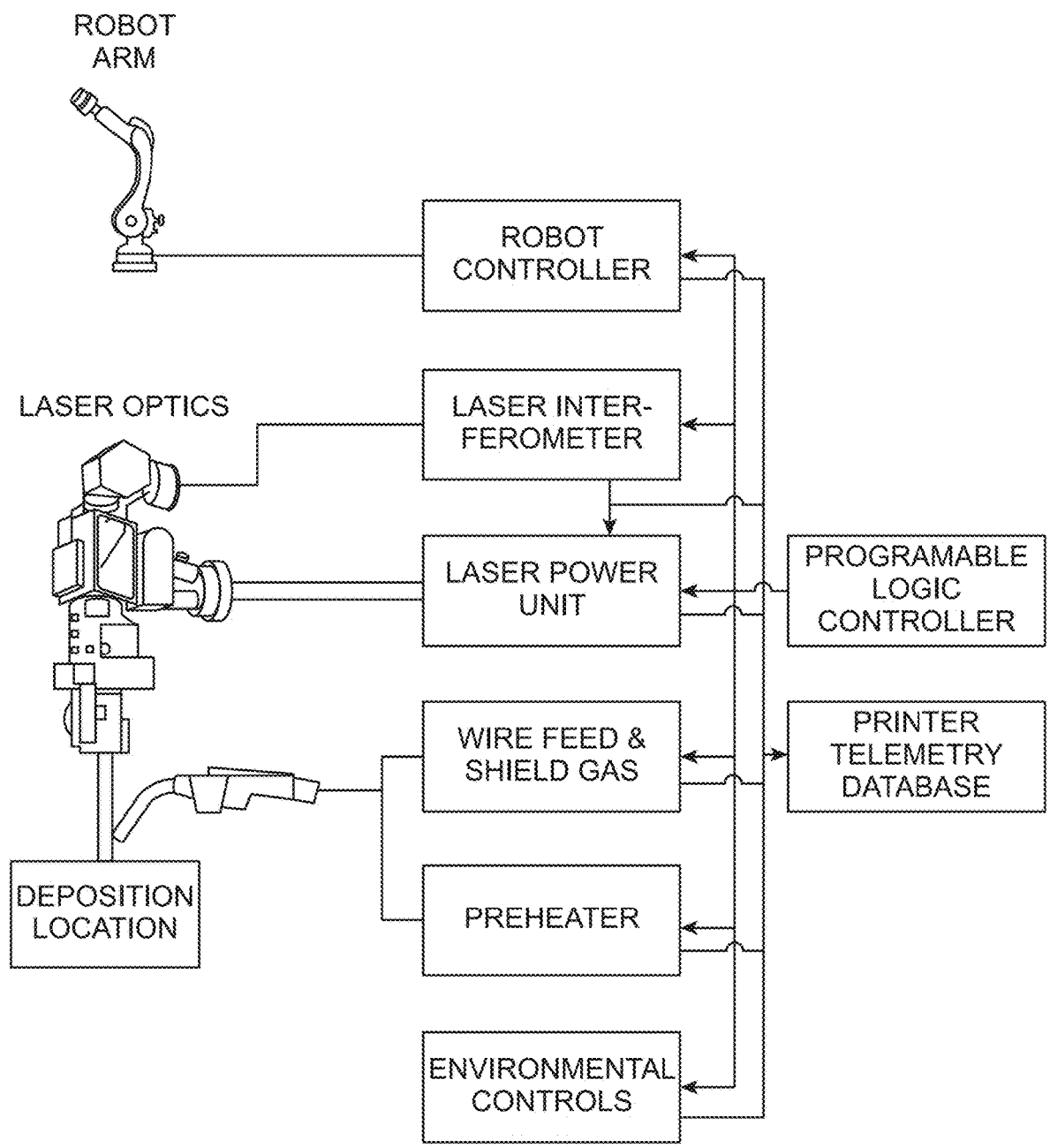
FIG. 5 is a diagram of one non-limiting example of a specific type of additive manufacturing system, i.e., a laser-metal wire deposition system.

FIG. 5 illustrates one non-limiting example of a laser-metal wire deposition system that comprises a robotic controller, a laser power unit, a wire feed and shield gas module, a wire pre-heater, and environmental controller, a telemetry database (for transmitting and recording process control instructions sent to and process monitoring data read from the deposition system), and a programmable logic controller (which coordinates the overall operation of the system components), as well as a laser interferometer. The laser interferometer provides real-time feedback on melt pool properties. In some embodiments, the deposition system may further comprise a processor programmer to utilize a machine learning algorithm, e.g., an artificial neural network, for real-time, adaptive control of the metal deposition process. In some embodiments, the deposition system may also include machine vision systems or other inspection tools monitor process parameters and/or to provide for automated classification of object defects (post-build or in-process), and may incorporate such process monitoring or defect classification for use by the machine algorithm in predicting next action(s) by the deposition process.

FIG. 2 provides a schematic illustration of an example set-up for a material deposition process, e.g., a laser-metal wire deposition process, according to some embodiments of the present disclosure. The laser beam impinges on the metal wire to create a melt pool at the point of intersection and deposit material on a substrate. The melt pool material subsequently hardens to form a new layer as the laser and wire feed (i.e. the print head) are moved relative to the substrate. The wire is shielded from air-borne contaminants with the use of a sheath of shield gas. As indicated by the example of FEA simulation date presented in FIG. 4C, heat propagates from the position of the melt pool through the underlying substrate (or previously deposited layers) in an asymmetric fashion due to the translational motion of the print head relative to the substrate. The newly deposited layer forms a metallurgical bond with the substrate (or previously deposited layers) in a region referred to as the fusion zone. The propagation of heat through the newly deposited layer to the substrate (or previously deposited layers) may in some instances affect material properties within a region referred to as the heat affected zone. The solidification process may also cause metallurgical defects such as pores and cracks to form in the deposited layer. The quantity and type of defects that arise are dependent on the amount of heat input, the time spent at elevated temperatures, the geometry of the printed part, and the presence of contaminants near the melt pool.

Figure 6A:
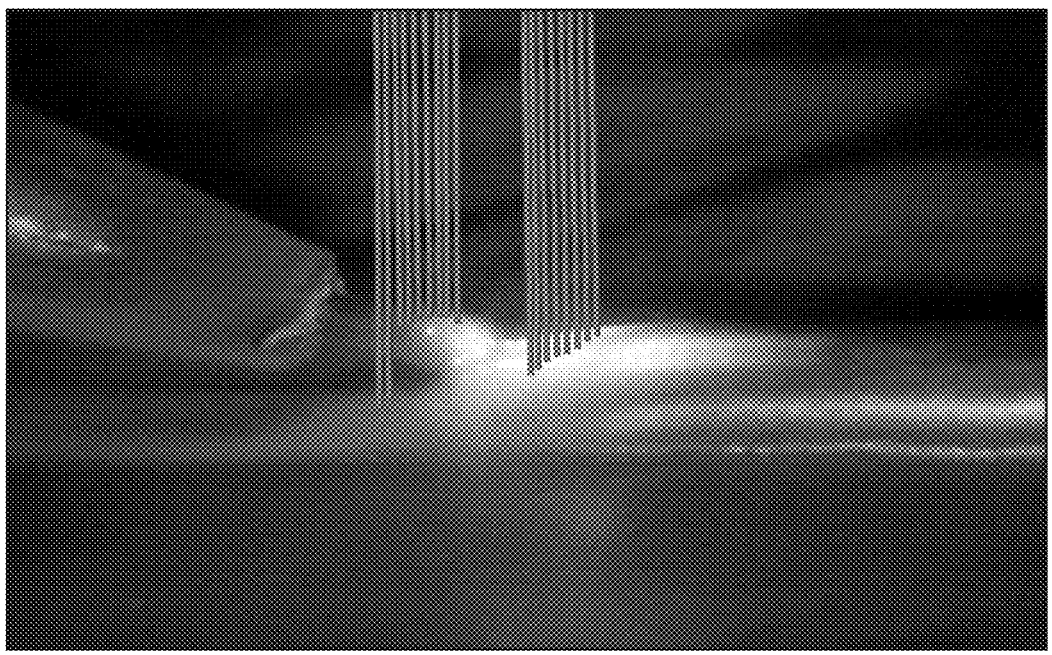
FIGS. 6A-B illustrate one non-limiting example of in-process feature monitoring using interferometry.
Figure 6B:
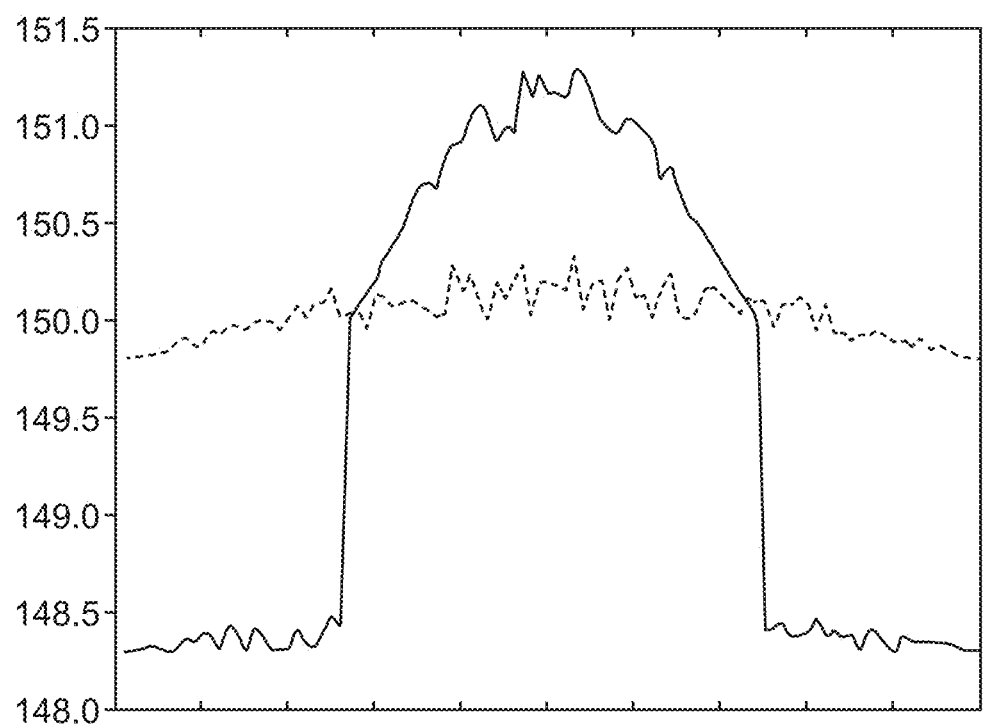

FIGS. 6A-B illustrate the use of laser interferometry to monitor melt pool and deposition layer properties in a laser-metal wire deposition process. FIG. 6A shows a micrograph of the deposition process at the location where the laser beam impinges on the metal wire. The vertical lines indicate the position of the interferometer probe beam as it is used to monitor the height profile of the wire feed and previously deposited layer and resulting melt pool. FIG. 6B provides examples of cross-sectional profiles (i.e., height profiles across the width of the deposition) of the wire feed, previously deposited layer, and melt pool as measured using laser interferometry at the position of the wire feed (solid line; the peak indicates the wire, while the shoulders indicate the height of the previously deposited layer) and the melt pool (dashed line). The x-axis (width) dimension is plotted in arbitrary units. The y-axis (height) dimension is plotted in units of millimeters relative to a fixed reference point below the deposition layer. In some embodiments of the disclosed adaptive process control methods, such real-time process monitoring data may be used by a processor running a machine learning algorithm to make adjustment(s) to one or more process control parameters in order to improve, for example, the dimensional accuracy of the layer, layer surface finish and/or adhesion properties, and/or the overall efficiency of the deposition process.

In some embodiments, laser interferometry may be used to monitor the dimensions and/or properties of the melt pool, the deposited layer downstream from the melt pool, or other features of the part being fabricated at one or more positions on the part. In some embodiment, laser interferometry may be used to monitor the dimensions and/or properties of the part being fabricated at at least 1, at least 2, at least 3, at least 4, at least 5, at least 6, at least 7, at least 8, at least 9, or at least 10 different positions on the part. In some embodiment, the laser interferometry data for dimensions and/or other properties of the part may be updated at a rate of at least 0.1 Hz, 1 Hz, 5 Hz, 10 Hz, 20 Hz, 30 Hz, 40 Hz, 50 Hz, 60 Hz, 70 Hz, 80 Hz, 90 Hz, 100 HZ, 250 Hz, 500 Hz, 750 Hz, 1,000 Hz, 2,500 Hz, 5,000 Hz, 10,000 Hz, 25,000 Hz, 50,000 Hz, 100,000 Hz, 150,000 Hz, 200,000 Hz, 250,000 Hz, or higher. Those of skill in the art will recognize that the rate at which the interferometry data may be updated may have any value within this range, e.g., about 800 Hz.

Machine vision systems: Another specific example of a free form deposition or joining process monitoring tool that may be used with, for example, a laser-metal wire deposition system is machine vision. Machine vision systems provide imaging-based automatic inspection and analysis for a variety of industrial inspection, process control, and robot guidance applications, and may comprise any of a variety of image sensors or cameras, light sources or illumination systems, and additional imaging optical components, as well as processors and image processing software.

Figure 7A:
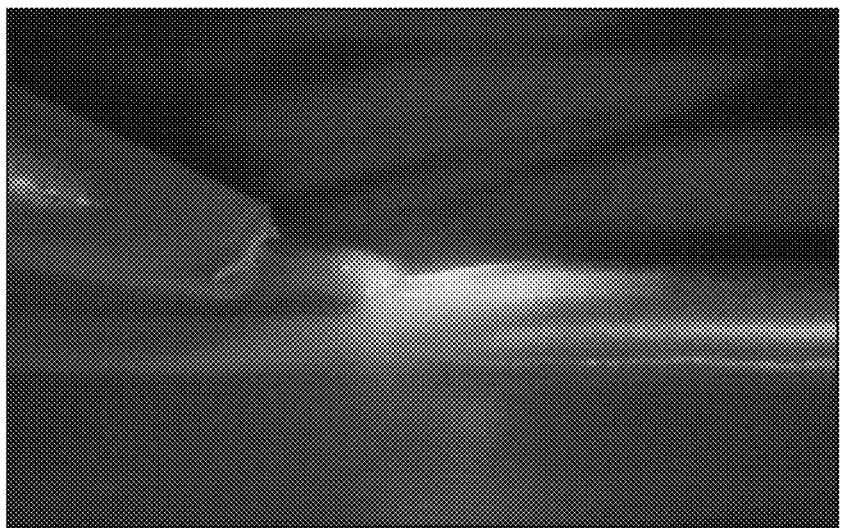
FIGS. 7A-C illustrate one non-limiting example of in-process feature extraction from images of a laser-metal wire deposition process obtained using a machine vision system.
Figure 7B:
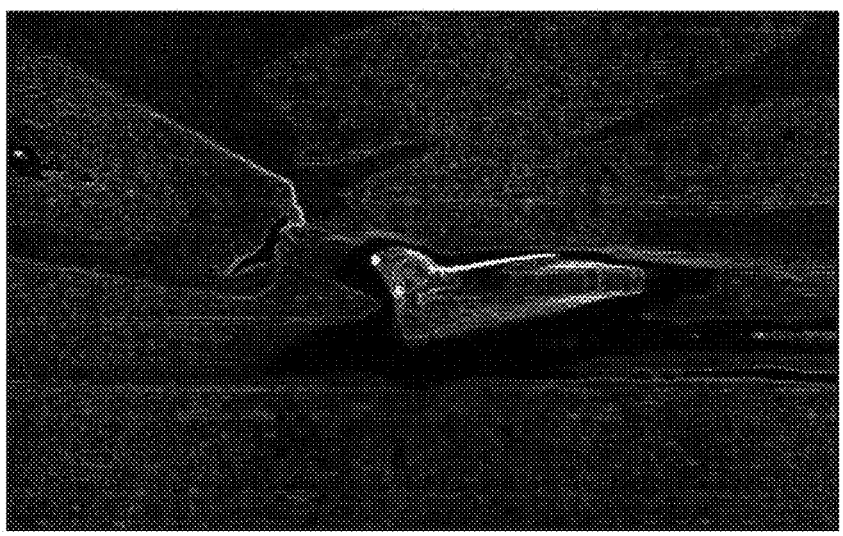
Figure 7C:
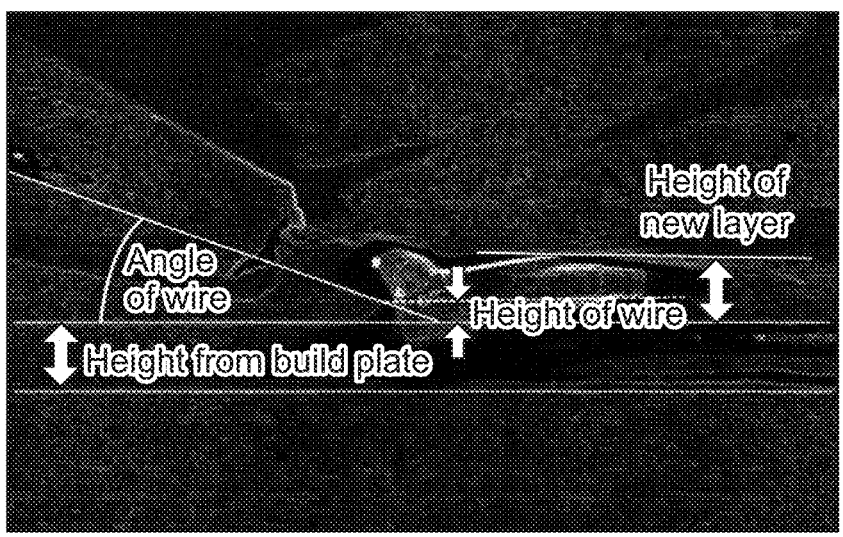

FIGS. 7A-C illustrate in-process feature extraction from images of a laser-metal wire deposition process obtained using a machine vision system. FIG. 7A shows a raw image (e.g., one image frame grabbed from a video rate data stream) of the melt pool adjacent to the tip of the wire. FIG. 7B shows the processed image after de-noising, filtering, and edge detection algorithms have been applied. FIG. 7C shows the processed image after application of a feature extraction algorithm used to identify, for example, the angel of the wire relative to the build plate and the height (thickness) of the new layer. Machine vision systems and the associated image processing capability allow one to monitor details of the deposition process in real-time.

In some embodiments, one or more machine vision systems may be used with the disclosed adaptive process control methods and systems to acquire and process single images. In some embodiments, one or more machine vision systems may be used with the disclosed adaptive process control methods and systems to acquire and process a series of one or more images at defined time intervals. In many embodiments, one or more machine vision systems may be used with the disclosed adaptive process control methods and systems to acquire and process video rate image data. In general, image data supplied by the one or more machine vision systems may be acquired and/or processed at a rate of at least 0.1 Hz, 1 Hz, 5 Hz, 10 Hz, 20 Hz, 30 Hz, 40 Hz, 50 Hz, 60 Hz, 70 Hz, 80 Hz, 90 Hz, 100 HZ, 250 Hz, 500 Hz, 750 Hz, 1,000 Hz, 2,500 Hz, 5,000 Hz, or higher. Those of skill in the art will recognize that the rate at which image data may be acquired and/or processed may have any value within this range, e.g., 95 Hz.

In some embodiments, one or more machine vision systems used with the disclosed adaptive process control methods and systems may be configured to acquire images at specific wavelengths (or within specific wavelength ranges) or in different imaging modes. For example, in some embodiments, one or more machine vision system may be configured to acquire images in the x-ray region, ultraviolet region, visible region, near infrared region, infrared region, terahertz region, microwave region, or radiofrequency region of the electromagnetic spectrum, or any combination thereof. In some embodiments, one or more machine vision systems may be configured to acquire fluorescence images (e.g., where the wavelength range for the excitation light is different than that for the collected fluorescence emission light). In some embodiments, one or more machine vision systems may be configured to acquire coherent Raman scattering (CRS) images (e.g., stimulated Raman scattering (SRS) or anti-Stokes Raman scattering (CARS) images) to provide label-free chemical imaging of the deposition layer or part being fabricated.

Post-Build Inspection Tools and Automated Defect Classification:

Disclosed herein are automated object defect classification methods and systems used to identify and characterize defects in fabricated parts. The approach is based on the use of a machine learning algorithm for detection and classification of defects, where the machine learning algorithm is trained using a training dataset that comprises post-build inspection data provided by a skilled operator and/or inspection data provided by any of a variety of automated inspection tools known to those of skill in the art. The disclosed automated object defect classification methods and systems may be applied to any of a variety of free form deposition or joining processes known to those of skill in the art. In some embodiments, the disclosed automated object defect classification methods and systems may be used strictly for post-build inspection of new parts. In some embodiments, they may be used in-process to provide real-time process characterization data to a machine learning algorithm used to run the process control, so that one or more process control parameters may be adjusted in real-time. In some embodiments, the disclosed automated object defect classification methods and systems may be used both in-process to provide real-time process characterization data and for post-build inspection. In some embodiments, in-process automated defect classification data may be used by the machine learning algorithm to determine a set or sequence of process control parameter adjustments that will implement a corrective action, e.g., to adjust a layer dimension or thickness, so as to correct a defect when first detected. In some embodiments, in-process automated defect classification may be used by the machine learning algorithm to send a warning or error signal to an operator, or optionally, to automatically abort the deposition process, e.g., an additive manufacturing process. In some embodiments, once trained, the automated defect classification system requires no further user input (e.g., no further input from a skilled operator or inspector) to detect and classify defects either in-process and/or post-build.

The automated object defect classification methods will generally comprise: a) providing a training data set, wherein the training data set comprises fabrication process simulation data, fabrication process characterization data, and/or post-build inspection data, or any combination thereof, for a plurality of design geometries that are the same as or different from that of the object; b) providing one or more sensors, wherein the one or more sensors provide real-time data for one or more object properties; c) providing a processor programmed to provide a classification of detected object defects using a machine learning algorithm that has been trained using the training data set of step (a), wherein the real-time data from the one or more sensors is provided as input to the machine learning algorithm and allows the classification of detected object defects to be adjusted in real-time.

Training data sets: As noted above, the training data set may comprise fabrication process simulation data, fabrication process characterization data, post-build inspection data (including inspection data provided by a skilled operator and/or inspection data provided by any of a variety of automated inspection tools), or any combination thereof, for past fabrication runs of a plurality of design geometries that are the same as or different from that of the object currently being fabricated. One or more training data sets may be used to train the machine learning algorithm used for object defect detection and classification. In some cases, the type of data included in the training data set may vary depending on the specific type of machine learning algorithm employed, as will be discussed in more detail below. For example, in the case that an expert system (or expert learning system) the training data set may comprise primarily defect classification data provided by a skilled operator or technician in visually identifying and classifying object defects for the same type of part or for a variety of different parts that share some common set of features. In some instances, the training data set may be updated in real-time with object defect and object classification date as it is performed on a given system. In some instances, the training data may be updated with object defect data and object classification data drawn from a plurality of automated defect classification systems.

In some embodiments, the training data set may comprise process simulation data, process characterization data, in-process inspection data, post-build inspection data, or any combination thereof. In some embodiments, the training data set may comprise a single type of data selected from the group consisting of process simulation data, process characterization data, in-process inspection data, and post-build inspection data. In some embodiments, the training data set may comprise a combination of any two or any three types of data selected from the group consisting of process simulation data, process characterization data, in-process inspection data, and post-build inspection data. In some embodiments, the training data set may comprise all of these types of data, i.e., process simulation data, process characterization data, in-process inspection data, and post-build inspection data.

Object property measurement: Any of a variety of sensors or other inspection tools may be used, including some of those listed above for process monitoring in general. In some embodiments, the one or more sensors (e.g., image sensors or machine vision systems) provide data on electromagnetic radiation that is reflected, scattered, absorbed, transmitted, or emitted by the object. In some embodiments, the electromagnetic radiation is x-ray, ultraviolet, visible, near-infrared, or infrared light. In some embodiments, the one or more sensors provide data on acoustic energy that is reflected, scattered, absorbed, transmitted, or emitted by the object. In some embodiments, the one or more sensors provide data on an electrical conductivity or a thermal conductivity of the object. In some embodiments, the one or more sensors may provide data to the processor programmed to provide a classification of detected object defects using a machine learning algorithm at an update rate of at least 0.1 Hz, 1 Hz, 5 Hz, 10 Hz, 20 Hz, 30 Hz, 40 Hz, 50 Hz, 60 Hz, 70 Hz, 80 Hz, 90 Hz, 100 HZ, 250 Hz, 500 Hz, 750 Hz, 1,000 Hz, 2,500 Hz, 5,000 Hz, 10,000 Hz, or higher. Those of skill in the art will recognize that the one or more sensors or process monitoring tools may provide data at an update rate having any value within this range, e.g., about 400 Hz.

In a preferred embodiment the automated object defect classification methods and systems of the present disclosure may be implemented using image sensors and/or machine vision systems. Automated image processing of the captured images may then be used to monitor any of a variety of object properties, e.g., dimensions (overall dimensions, or dimensions of specific features), feature angles, feature areas, surface finish (e.g., degree of light reflectivity, number of pits and/or scratches per unit area), and the like. In some embodiments, object properties such as local, excessively high temperatures that may be correlated with defects or defect generation in printed or welded parts may be monitored using infrared or visible wavelength cameras.

Noise removal from sensor data: In some embodiments, the automated defect classification methods may further comprise removing noise from the object property data provided by the one or more sensors prior to providing it to the machine learning algorithm. Examples of data processing algorithms suitable for use in removing noise from the object property data provided by the one or more sensors include, but are not limited to, signal averaging algorithms, smoothing filter algorithms, Kalman filter algorithms, non-linear filter algorithms, total variation minimization algorithms, or any combination thereof.

Subtraction of reference data sets: In some embodiments of the disclosed automated defect classification methods, subtraction of a reference data set from the sensor data may be used to increase contrast between normal and defective features of the object, thereby facilitating defect detection and classification. For example, a reference data set may comprise sensor data recorded by one or more sensors for an ideal, defect-free example of the object to be fabricated. In the case that an image sensor or machine vision system is used for defect detection, the reference data set may comprise an image (or set of images, e.g., representing different views) of an ideal, defect-free object.

Machine learning algorithms for defect detection and classification: Any of a variety of machine learning algorithms may be used in implementing the disclosed automated object defect detection and classification methods. The machine learning algorithm employed may comprise a supervised learning algorithm, an unsupervised learning algorithm, a semi-supervised learning algorithm, a reinforcement learning algorithm, a deep learning algorithm, or any combination thereof. In preferred embodiments, the machine learning algorithm employed for defect identification and classification may comprise a support vector machine (SVM), an artificial neural network (ANN), or a decision tree-based expert learning system, some of which will be described in more detail below. In some preferred embodiments, object defects may be detected as differences between an object property data set and a reference data set that are larger than a specified threshold, and may be classified using a one-class support vector machine (SVM) or autoencoder algorithm. In some preferred embodiments, object defects may be detected and classified using an unsupervised one-class support vector machine (SVM), autoencoder, clustering, or nearest neighbor (e.g., kNN) machine learning algorithm and a training data set that comprises object property data for both defective and defect-free objects.

Adaptive, Real-Time Deposition Process Control Using a Machine Learning Algorithm:

Disclosed herein are methods and systems for providing real-time adaptive control of deposition processes, e.g., additive manufacturing or welding processes. In general, the disclosed methods comprise a) providing an input design geometry for an object (e.g., a 3D CAD model); b) providing a training data set, wherein the training data set comprises process simulation data, process characterization data, post-build inspection data, or any combination thereof, for a plurality of design geometries or portions thereof that are the same as or different from the input design geometry of step (a); c) providing a predicted optimal set or sequence of one or more process control parameters for fabricating the object, wherein the predicted optimal set of one or more process control parameters are derived using a machine learning algorithm that has been trained using the training data set of step (b); and d) performing the deposition process, e.g., an additive manufacturing process, to fabricate the object, wherein real-time process characterization data is provided by one or more sensors as input to the machine learning algorithm to adjust one or more process control parameters in real-time. In some embodiments, steps (b)-(d) are performed iteratively and the process characterization data, post-build inspection data, or any combination thereof for each iteration is incorporated into the training data set. The disclosed process control methods may be used for any of a variety of deposition processes, including additive manufacturing processes, known to those of skill in the art, for example, stereolithography (SLA), digital light processing (DLP), fused deposition modeling (FDM), selective laser sintering (SLS), selective laser melting (SLM), electronic beam melting (EBM) process, laser beam welding, MIG (metal inert gas) welding, TIG (tungsten inert gas) welding, and the like. In a preferred embodiment, the disclosed process control methods are applied to a liquid-to-solid free form deposition process, for example, to a laser metal-wire deposition process.

Training data sets: As with the automated defect classification methods described above, the training data set(s) used in teaching the process control machine learning algorithm may comprise fabrication process simulation data, fabrication process characterization data, post-build inspection data (including inspection data provided by a skilled operator and/or inspection data provided by any of a variety of automated inspection tools), or any combination thereof, for past fabrication runs of a plurality of design geometries that are the same as or different from that of the object currently being fabricated. One or more training data sets may be used to train the machine learning algorithm used for adaptive, real-time deposition process control. In some cases, the type of data included in the training data set may vary depending on the specific type of machine learning algorithm employed, as will be discussed in more detail below. For example, in some cases the training data set may comprise primarily process control settings provided by a skilled operator or technician in successfully fabricating a number of the same type of part or for a variety of different parts that share some common set of features. In some instances, the training data set may be updated in real-time using process simulation data, process control data, process characterization data, in-process inspection data, and/or post-build inspection data as fabrication is performed on a given system. In some instances, the training data may be updated using process simulation data, process control data, process characterization data, in-process inspection data, and/or post-build inspection data as fabrication is performed on a plurality of deposition and/or welding systems.

In some embodiments, the training data set may comprise process simulation data, process characterization data, in-process inspection data, post-build inspection data, or any combination thereof. In some embodiments, the training data set may comprise a single type of data selected from the group consisting of process simulation data, process characterization data, in-process inspection data, and post-build inspection data. In some embodiments, the training data set may comprise a combination of any two or any three types of data selected from the group consisting of process simulation data, process characterization data, in-process inspection data, and post-build inspection data. In some embodiments, the training data set may comprise all of these types of data, i.e., process simulation data, process characterization data, in-process inspection data, and post-build inspection data.

Process characterization data: Any of a variety of sensors, measurement tools, or inspection tools may be used for monitoring various process parameters in real-time, including those listed above. In some embodiments, for example, laser interferometers are used to monitor the dimensions of the melt pool (in the case of laser-metal wire deposition) or other part dimensions as the part is being fabricated. In some embodiments, the one or more sensors (e.g., image sensors or machine vision systems) provide data on electromagnetic radiation that is reflected, scattered, absorbed, transmitted, or emitted by the object. In some embodiments, the electromagnetic radiation is x-ray, ultraviolet, visible, near-infrared, or infrared light. In some embodiments, real-time image acquisition and processing is used to monitor, for example, the angle of the wire feed relative to a baseplate or previously deposited layer, or the thickness of a deposited layer. In some embodiments, the one or more sensors provide data on acoustic energy that is reflected, scattered, absorbed, transmitted, or emitted by the object. In some embodiments, the one or more sensors provide data on an electrical conductivity or a thermal conductivity of the object. In some embodiments, the one or more sensors may provide process characterization data to the processor programmed to run the machine learning algorithm may be updated at a rate of at least 0.1 Hz, 1 Hz, 5 Hz, 10 Hz, 20 Hz, 30 Hz, 40 Hz, 50 Hz, 60 Hz, 70 Hz, 80 Hz, 90 Hz, 100 HZ, 250 Hz, 500 Hz, 750 Hz, 1,000 Hz, 2,500 Hz, 5,000 Hz, 10,000 Hz, or higher. Those of skill in the art will recognize that the one or more process characterization sensor may provide data at an update rate having any value within this range, e.g., about 8,000 Hz.

In a preferred embodiment, the real-time process characterization data that is fed to the machine learning algorithm used to run process control may comprise data supplied by an automated object defect classification system as described above, so that the deposition process control parameters may be adjusted in real-time to compensate or correct for part defects as they arise during the build process. The machine learning algorithm used to run the automated process control may be configured to adjust the process control parameters in real-time as necessary to maximize a reward function (or to minimize a loss function), as will be discussed in more detail below.

Machine learning algorithms for automated deposition process control: Any of a variety of machine learning algorithms may be used in implementing the disclosed process control methods, and may be the same or different from those used to implement the automated object defect classification methods described above. The machine learning algorithm employed may comprise a supervised learning algorithm, an unsupervised learning algorithm, a semi-supervised learning algorithm, a reinforcement learning algorithm, a deep learning algorithm, or any combination thereof. In preferred embodiments, the machine learning algorithm employed may comprise an artificial neural network algorithm, a Gaussian process regression algorithm, a logistical model tree algorithm, a random forest algorithm, a fuzzy classifier algorithm, a decision tree algorithm, a hierarchical clustering algorithm, a k-means algorithm, a fuzzy clustering algorithm, a deep Boltzmann machine learning algorithm, a deep convolutional neural network algorithm, a deep recurrent neural network, or any combination thereof, some of which will be described in more detail below.

Reward functions and loss functions: As noted above, in some embodiments the machine learning algorithm used to run the automated process control may be configured to adjust the process control parameters in real-time as necessary to maximize a reward function (or to minimize a loss function) in order to optimize the deposition process. As used herein, a reward function (or conversely, a loss function (sometimes also referred to as a cost function or error function)) refers to a function that maps the values of one or more additive manufacturing process variables and/or fabrication event outcomes to a real number that represents the "reward" associated with a given fabrication event (or the "cost" in the case of a loss function). Examples of process parameters and fabrication event outcomes that may be used in defining a reward (or loss) function include, but are not limited to, process throughput (e.g. number of parts fabricated per unit time), process yield (e.g., the percentage of parts produced that meet a specified set of quality criteria), production quality (e.g., mean squared deviation in part dimension(s) between the parts produced and an ideal, defect-free reference part, or the average number of defects detected per part produced), production cost (e.g., the cost per part produced), and the like. In some cases, the definition of the reward function (or loss function) to be maximized (or minimized) may be dependent on the choice of machine learning algorithm used to run the process control method, and vice versa. For example, if the objective is to maximize a total reward/value function, a reinforcement learning algorithm may be chosen. If the objective is to minimize a mean squared error cost (or loss) function, a decision tree regression algorithm or linear regression algorithm may be chosen. In general, the machine learning algorithm used to run the process control method will seek to optimize the reward function (or minimize the loss function) by (i) identifying the current "state" of the part under fabrication (e.g., based on the real-time stream of process characterization data supplied by one or more sensors), (ii) comparing the current "state" to the design target (or reference "state"), and (iii) adjusting one or more process control parameters in order to minimize the difference between the two states (e.g., based on past "learning" provided by the training data set).

Figure 8:
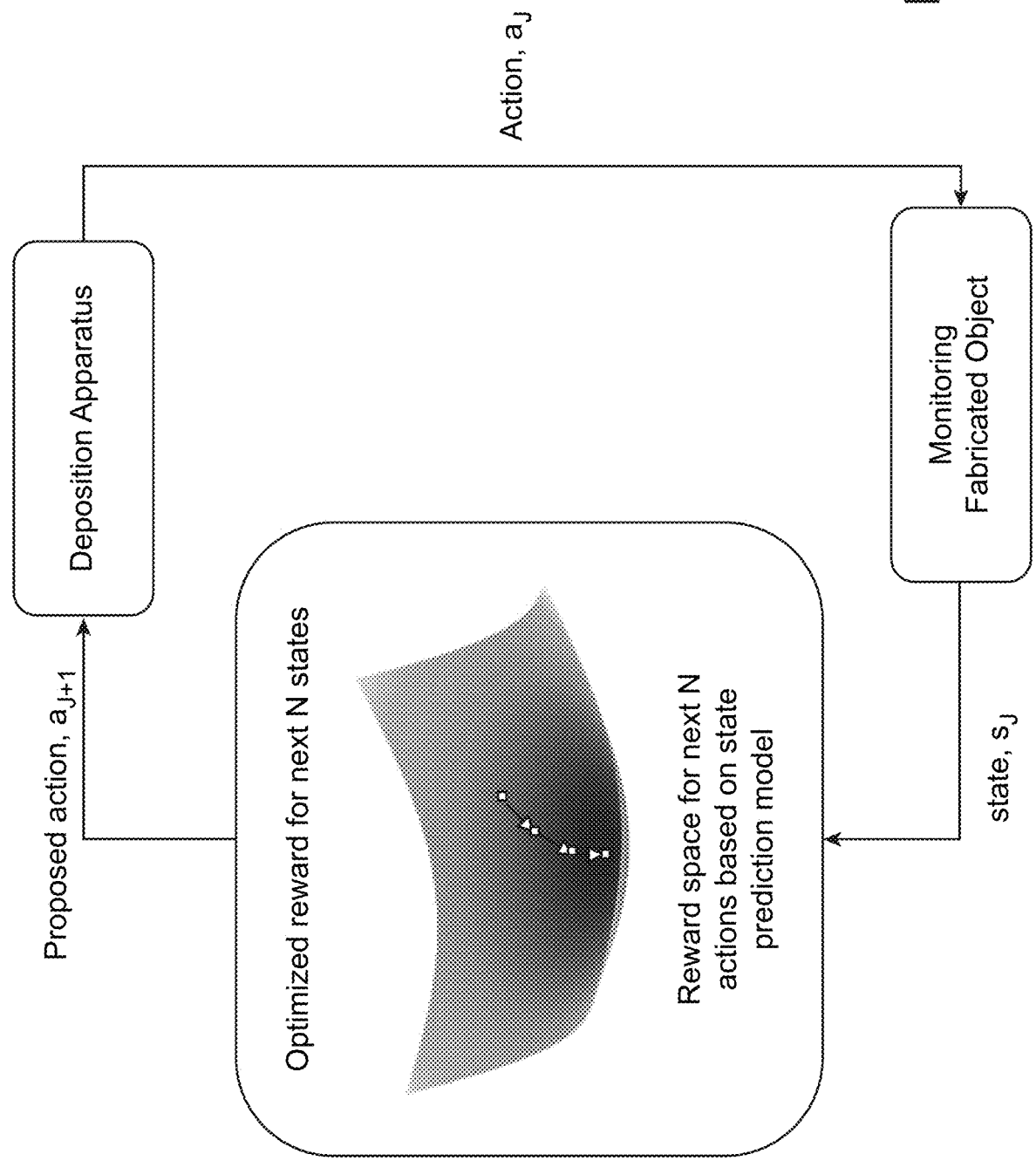
FIG. 8 illustrates an action prediction—reward loop for a reinforcement learning algorithm according to some embodiments of the present disclosure.

FIG. 8 illustrates an action prediction—reward loop for a reinforcement learning algorithm according to some embodiments of the disclosed deposition or welding process control methods. In the case of a deposition process, for example, at any point in time during or following completion of layer deposition (action $a_1$), the part being fabricated is monitored using any of a variety of sensors, measuring tools, inspection tools, and/or machine vision systems as described above to determine the current build "state" of the part (state $s_1$). In a preferred embodiment, the part is monitored in real-time using an automated object defect classification system as disclosed herein. Once the current build state of the part has been determined, a reinforcement learning algorithm uses the current state information, $s_1$, and the model developed using past training data to predict a proposed action, $a_{j+1}$, (e.g., a set or sequence of process control parameter adjustments) that will maximize a reward function. If the current build state, $s_1$, is relatively poor (i.e., associated with a low value of the reward function), it may not be desirable to simply take the set of actions that produces the highest reward in the next build state, $s_{j+1}$, because that may not produce the maximum reward in the long run. In some cases, maximizing the reward for the immediate next build state, $s_{j+1}$, may force a decision between very low reward states for next few build states, e.g., $s_{j+2}$, $s_{j+3}$, $s_{j+4}$, thereafter. By using the learned process model to look a bit further into the future, one can optimize the process control parameter adjustments for the next N build states as opposed to just the immediate next state. Each set of "next N states" starting from state $s_j$ has a corresponding reward (i.e., the reward space for the next N actions) that can be predicted using the previously trained model that predicts the correlation between actions and their resulting state. Thus the learned model may be used to determine a sequence of actions that optimizes the sum (or weighted sum) of reward values for the next N states. The loop is repeated until the part is complete, and provides adaptive control of the deposition process to provide for rapid optimization and adjustment of the process control parameters used in response to changes in process or environmental parameters, as well as improved process yield, process throughput, and quality of the parts.

Figure 9:
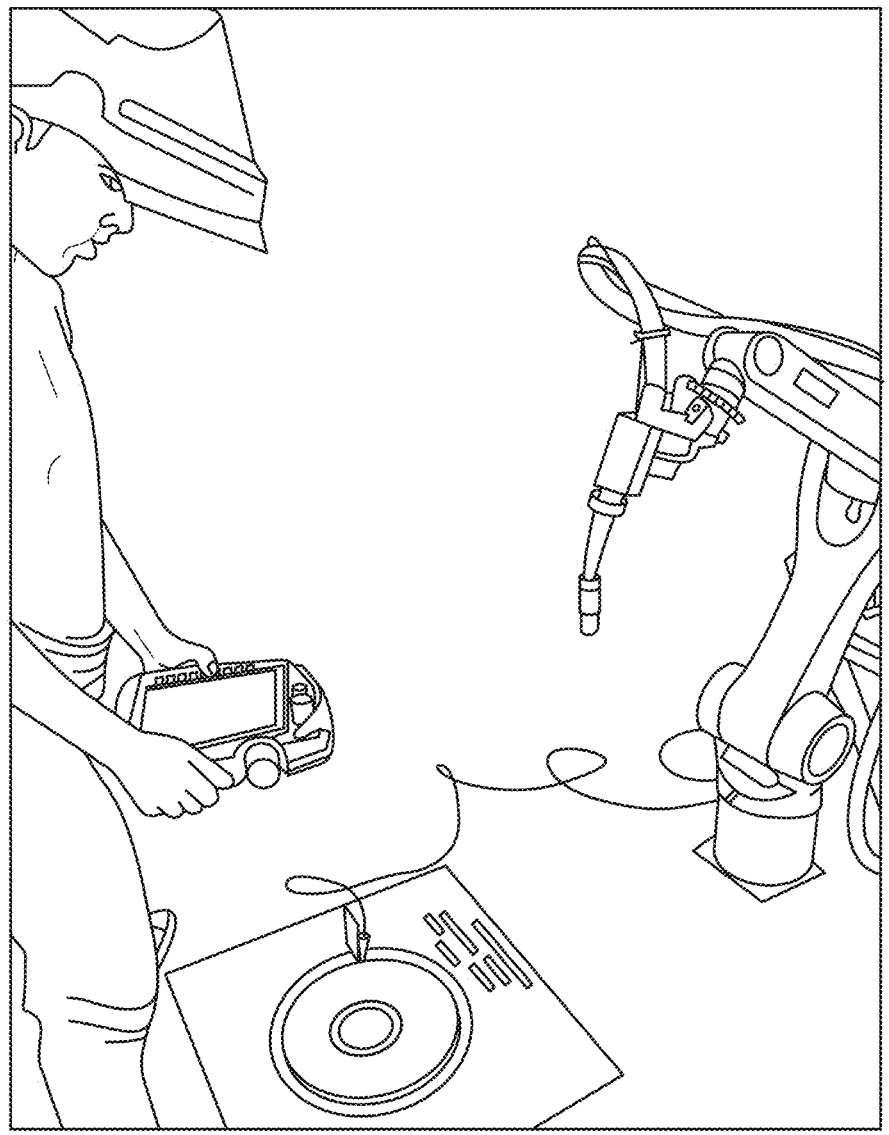
FIG. 9 illustrates reward function construction based on monitoring the actions that a human operator chooses during a manually-controlled deposition process.

FIG. 9 illustrates reward function construction where the training data used to generate the reward function-based state prediction model is acquired by monitoring the actions that a human operator chooses during a manually-controlled deposition process. In some embodiments, the machine learning algorithm may be wholly or partially self-trained. For example, in some embodiments, as part of the training of the machine learning algorithm, the machine learning algorithm may randomly choose values within a specified range for each of a set of one or more process control parameters, and incorporate the resulting process simulation data, process characterization data, in-process inspection data, post-build inspection data, or any combination thereof, into the training data set to improve a learned model that maps process control parameter values to process outcomes.

In general, the methods and systems for adaptive, real-time control of deposition processes that are disclosed herein do not rely on static data look-up operations (e.g., looking up process control parameters or process characterization data from previous runs). Rather, a machine learning algorithm is used to explore a range of input values for one or more process control parameters during process simulation and/or actual part fabrication, and generates a learned model that maps input process control parameters to process outcomes under a variety of different process and environmental conditions.

Process Control Parameter Update Rates: In some embodiments, the one or more sensors may provide data to the processor programmed to run a machine learning algorithm so that one or more process control parameters may be adjusted at an update rate of at least 0.1 Hz, 1 Hz, 5 Hz, 10 Hz, 20 Hz, 30 Hz, 40 Hz, 50 Hz, 60 Hz, 70 Hz, 80 Hz, 90 Hz, 100 HZ, 250 Hz, 500 Hz, 750 Hz, 1,000 Hz, 2,500 Hz, 5,000 Hz, 10,000 Hz, or higher. Those of skill in the art will recognize that the one or more process control parameters may be adjusted or updated at a rate having any value within this range, e.g., about 8,000 Hz.

Machine Learning Algorithms for Adaptive Process Control:

As noted above, the machine learning algorithm(s) employed in the disclosed automated defect classification and additive manufacturing process control methods may comprise a supervised learning algorithm, an unsupervised learning algorithm, a semi-supervised learning algorithm, a reinforcement learning algorithm, a deep learning algorithm, or any combination thereof.

Supervised Learning Algorithms: In the context of the present disclosure, supervised learning algorithms are algorithms that rely on the use of a set of labeled training data to infer the relationship between a set of one or more defects identified for a given object and a classification of the object according to a specified set of quality criteria, or to infer the relationship between a set of input additive manufacturing process control parameters and a set of desired fabrication outcomes. The training data comprises a set of paired training examples, e.g., where each example comprises a set of defects detected for a given object and the resultant classification of the given object, or where each example comprises a set of process control parameters that were used in a fabrication process that is paired with the known outcome of the fabrication process.

Unsupervised Learning Algorithms: In the context of the present disclosure, unsupervised learning algorithms are algorithms used to draw inferences from training datasets consisting of object defect datasets that are not paired with labeled object classification data, or input additive manufacturing process control parameter data that are not paired with labeled fabrication outcomes. The most commonly used unsupervised learning algorithm is cluster analysis, which is often used for exploratory data analysis to find hidden patterns or groupings in process data.

Semi-Supervised Learning Algorithms: In the context of the present disclosure, semi-supervised learning algorithms are algorithms that make use of both labeled and unlabeled object classification or additive manufacturing process data for training (typically using a relatively small amount of labeled data with a large amount of unlabeled data).

Reinforcement Learning Algorithms: In the context of the present disclosure, reinforcement learning algorithms are algorithms which are used, for example, to determine a set of additive manufacturing process steps (or actions) that should be taken so as to maximize a specified fabrication process reward function. In machine learning environments, reinforcement learning algorithms are often formulated as Markov decision processes. Reinforcement learning algorithms differ from supervised learning algorithms in that correct training data input/output pairs are never presented, nor are sub-optimal actions explicitly corrected. These algorithms tend to be implemented with a focus on real-time performance through finding a balance between exploration of possible outcomes based on updated input data and exploitation of past training.

Deep Learning Algorithms: In the context of the present disclosure, deep learning algorithms are algorithms inspired by the structure and function of the human brain called artificial neural networks (ANNs), and specifically large neural networks comprising many layers, that are used to map object defect data to object classification decisions, or to map input additive manufacturing process control parameters to desired fabrication outcomes. Artificial neural networks will be discussed in more detail below.

Decision Tree-Based Expert Systems: In the context of the present disclosure, expert systems are one example of supervised learning algorithms that are designed to solve object defect classification problems or additive manufacturing process control problems by applying a series of if then rules. Expert systems typically comprise two subsystems: an inference engine and a knowledge base. The knowledge base comprises a set of facts (e.g., a training data set comprising object defect data for a series of fabricated parts, and the associated object classification data provided by a skilled operator, technician, or inspector) and derived rules (e.g., derived object classification rules). The inference engine then applies the rules to data for a current object classification problem or process control problem to determine a classification of the object or a next set of process control adjustments.

Support Vector Machines (SYMs): In the context of the present disclosure, support vector machines are supervised learning algorithms used for classification and regression analysis of object defect classification date or additive manufacturing process control. Given a set of training data examples (e.g., object defect data), each marked as belonging to one or the other of two categories (e.g., good or bad, pass or fail), an SVM training algorithm builds a model that assigns new examples (e.g., defect data for a newly fabricated object) to one category or the other.

Autoencoders: In the context of the present disclosure, an autoencoder (also sometimes referred to as an autoassociator or Diabolo network) is an artificial neural network used for unsupervised, efficient mapping of input data, e.g., object defect data, to an output value, e.g., an object classification. Autoencoders are often used for the purpose of dimensionality reduction, i.e., the process of reducing the number of random variables under consideration by deducing a set of principal component variables. Dimensionality reduction may be performed, for example, for the purpose of feature selection (i.e., a subset of the original variables) or feature extraction (i.e., transformation of data in a high-dimensional space to a space of fewer dimensions).

Artificial Neural Networks (ANNs): In some cases, the machine learning algorithm used for the disclosed automated object defect classification or adaptive process control methods may comprise an artificial neural network (ANN), e.g., a deep machine learning algorithm. The automated object classification methods of the present disclosure may, for example, employ an artificial neural network to map object defect data to object classification data. The additive manufacturing process control systems of the present disclosure may, for example, employ an artificial neural network (ANN) to determine an optimal set or sequence of process control parameter settings for adaptive control of an additive manufacturing process in real-time based on a stream of process monitoring data and/or object defect classification data provided by one or more sensors. The artificial neural network may comprise any type of neural network model, such as a feedforward neural network, radial basis function network, recurrent neural network, or convolutional neural network, and the like. In some embodiments, the automated object defect classification and additive manufacturing process control methods and systems of the present disclosure may employ a pre-trained ANN architecture. In some embodiment, the automated object defect classification and additive manufacturing process control methods and systems of the present disclosure may employ an ANN architecture wherein the training data set is continuously updated with real-time object classification data or real-time deposition process control and monitoring data from a single local system, from a plurality of local systems, or from a plurality of geographically distributed systems.

As used throughout this disclosure, the term "real-time" refers to the rate at which sensor data (e.g. process control data, process monitoring data, and/or object defect identification and classification data) is acquired, processed, and/or used by a machine learning algorithm, e.g., an artificial neural network or deep machine learning algorithm, to update a prediction of object classification or a prediction of optimal process control parameters in response to changes in one or more of the input sensor data streams. In general the update rate for the object classification or process control parameters provided by the disclosed object defect classification and additive manufacturing process control methods and systems may range from about 0.1 Hz to about 10,000 Hz. In some embodiments, the update rate may be at least 0.1 Hz, at least 1 HZ, at least 10 Hz, at least 50 Hz, at least 100 Hz, at least 250 Hz, at least 500 Hz, at least 750 Hz, at least 1,000 Hz, at least 2,000 Hz, at least 3,000 Hz, at least 4,000 Hz, at least 5,000 Hz, or at least 10,000 Hz. In some embodiments, the update rate may be at most 10,000 Hz, at most 5,000 Hz, at most 4,000 Hz, at most 3,000 Hz, at most 2,000 Hz, at most 1,000 Hz, at most 750 Hz, at most 500 Hz, at most 250 Hz, at most 100 Hz, at most 50 Hz, at most 10 Hz, at most 1 Hz, or at most 0.1 Hz. Those of skill in the art will recognize that the update rate may have any value within this range, for example, about 8,000 Hz.

Figure 10:
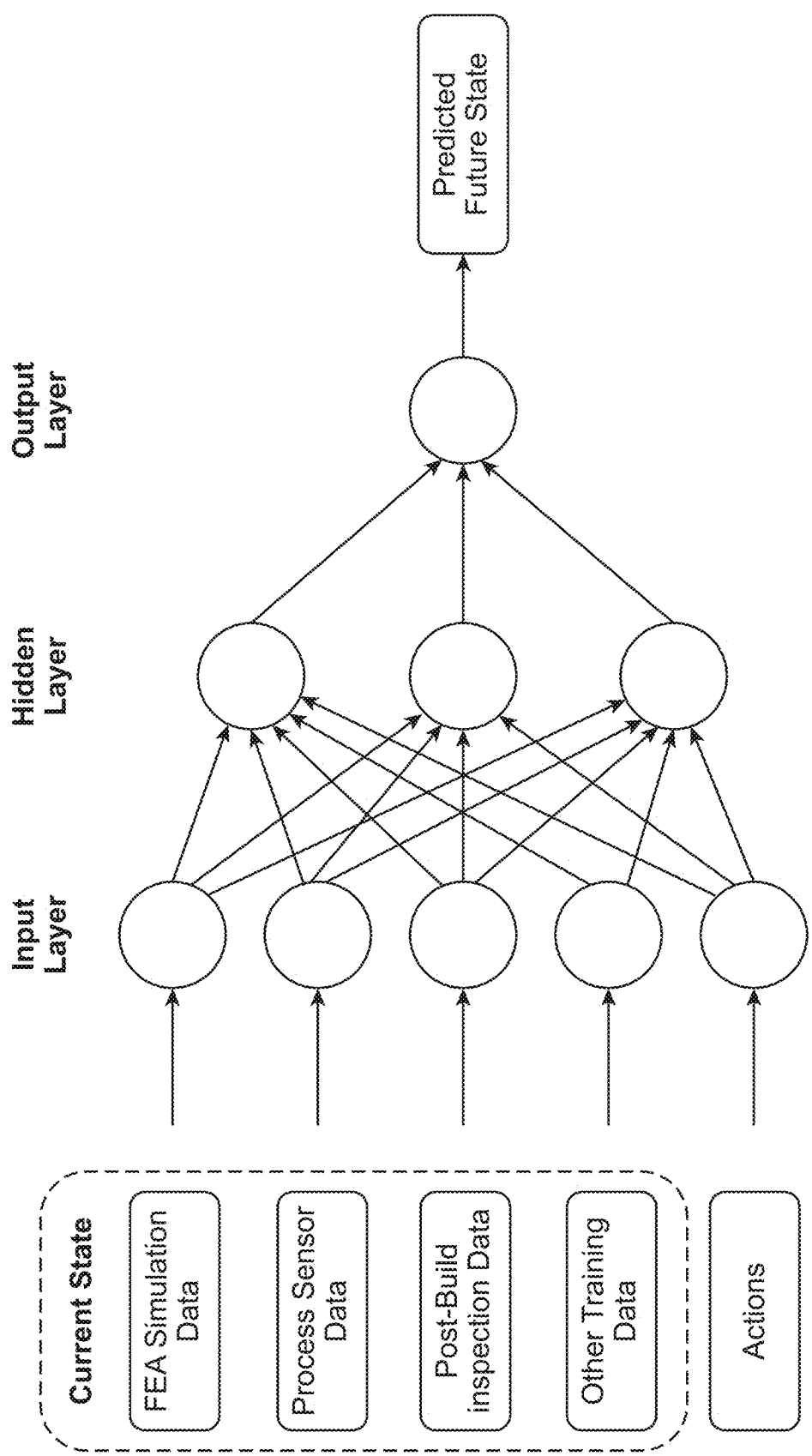
FIG. 10 provides a schematic illustration of an artificial neural network according to some embodiments of the present disclosure, and examples of the input(s) and output(s) of a neural network used to provide real-time, adaptive control of an additive manufacturing deposition process.
Figure 11:
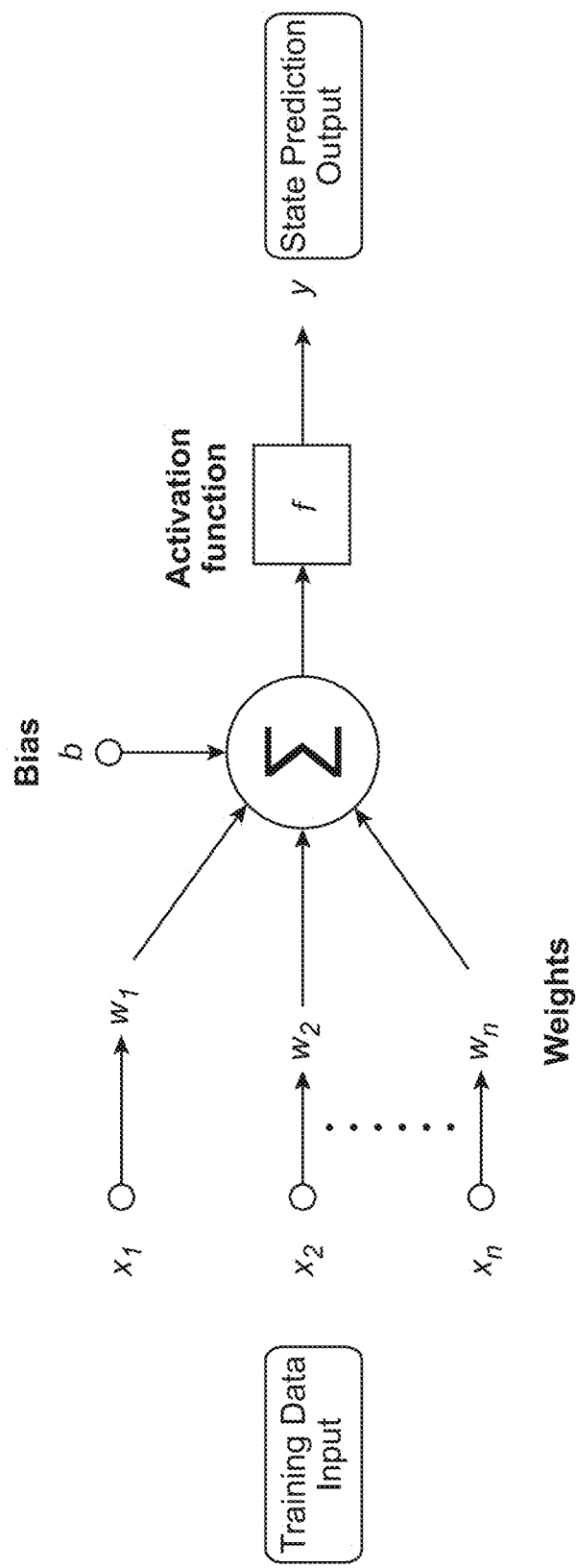
FIG. 11 provides a schematic illustration of the functionality of a node within a layer of an artificial neural network.

Artificial neural networks generally comprise an interconnected group of nodes organized into multiple layers of nodes (see FIG. 10). For example, the ANN architecture may comprise at least an input layer, one or more hidden layers, and an output layer. The ANN may comprise any total number of layers, and any number of hidden layers, where the hidden layers function as trainable feature extractors that allow mapping of a set of input data to a preferred output value or set of output values. Each layer of the neural network comprises a number of nodes (or neurons). A node receives input that comes either directly from the input data (e.g., sensor data, image data, object defect data, etc., in the case of the presently disclosed methods) or the output of nodes in previous layers, and performs a specific operation, e.g., a summation operation. In some cases, a connection from an input to a node is associated with a weight (or weighting factor). In some cases, the node may sum up the products of all pairs of inputs, $x_i$, and their associated weights, $w_i$ (FIG. 11). In some cases, the weighted sum is offset with a bias, b, as illustrated in FIG. 11. In some cases, the output of a neuron may be gated using a threshold or activation function, $f$, which may be a linear or non-linear function. The activation function may be, for example, a rectified linear unit (ReLU) activation function or other function such as a saturating hyperbolic tangent, identity, binary step, logistic, arcTan, softsign, parameteric rectified linear unit, exponential linear unit, softPlus, bent identity, softExponential, Sinusoid, Sinc, Gaussian, or sigmoid function, or any combination thereof.

The weighting factors, bias values, and threshold values, or other computational parameters of the neural network, can be "taught" or "learned" in a training phase using one or more sets of training data. For example, the parameters may be trained using the input data from a training data set and a gradient descent or backward propagation method so that the output value(s) (e.g., a set of predicted adjustments to process control parameter settings) that the ANN computes are consistent with the examples included in the training data set. The parameters may be obtained from a back propagation neural network training process that may or may not be performed using the same hardware as that used for automated object defect classification or adaptive, real-time deposition process control.

Other specific types of deep machine learning algorithms, e.g., convolutional neural networks (CNNs) (e.g., for the processing of image data from machine vision systems) may also be used by the disclosed methods and systems. CNN are commonly composed of layers of different types: convolution, pooling, upscaling, and fully-connected node layers. In some cases, an activation function such as rectified linear unit may be used in some of the layers. In a CNN architecture, there can be one or more layers for each type of operation performed. A CNN architecture may comprise any number of layers in total, and any number of layers for the different types of operations performed. The simplest convolutional neural network architecture starts with an input layer followed by a sequence of convolutional layers and pooling layers, and ends with fully-connected layers. Each convolution layer may comprise a plurality of parameters used for performing the convolution operations. Each convolution layer may also comprise one or more filters, which in turn may comprise one or more weighting factors or other adjustable parameters. In some instances, the parameters may include biases (i.e., parameters that permit the activation function to be shifted). In some cases, the convolutional layers are followed by a layer of ReLU activation function. Other activation functions can also be used, for example the saturating hyperbolic tangent, identity, binary step, logistic, arcTan, softsign, parameteric rectified linear unit, exponential linear unit, softPlus, bent identity, softExponential, Sinusoid, Sinc, Gaussian, the sigmoid function and various others. The convolutional, pooling and ReLU layers may function as learnable features extractors, while the fully connected layers may function as a machine learning classifier.

As with other artificial neural networks, the convolutional layers and fully-connected layers of CNN architectures typically include various computational parameters, e.g., weights, bias values, and threshold values, that are trained in a training phase as described above.

In general, the number of nodes used in the input layer of the ANN (which enable input of data from multiple sensor data streams and/or, for example, sub-sampling of an image frame) may range from about 10 to about 10,000 nodes. In some instances, the number of nodes used in the input layer may be at least 10, at least 50, at least 100, at least 200, at least 300, at least 400, at least 500, at least 600, at least 700, at least 800, at least 900, at least 1000, at least 2000, at least 3000, at least 4000, at least 5000, at least 6000, at least 7000, at least 8000, at least 9000, or at least 10,000. In some instances, the number of node used in the input layer may be at most 10,000, at most 9000, at most 8000, at most 7000, at most 6000, at most 5000, at most 4000, at most 3000, at most 2000, at most 1000, at most 900, at most 800, at most 700, at most 600, at most 500, at most 400, at most 300, at most 200, at most 100, at most 50, or at most 10. Those of skill in the art will recognize that the number of nodes used in the input layer may have any value within this range, for example, about 512 nodes.

In some instance, the total number of layers used in the ANN (including input and output layers) may range from about 3 to about 20. In some instance the total number of layer may be at least 3, at least 4, at least 5, at least 10, at least 15, or at least 20. In some instances, the total number of layers may be at most 20, at most 15, at most 10, at most 5, at most 4, or at most 3. Those of skill in the art will recognize that the total number of layers used in the ANN may have any value within this range, for example, 8 layers.

In some instances, the total number of learnable or trainable parameters, e.g., weighting factors, biases, or threshold values, used in the ANN may range from about 1 to about 10,000. In some instances, the total number of learnable parameters may be at least 1, at least 10, at least 100, at least 500, at least 1,000, at least 2,000, at least 3,000, at least 4,000, at least 5,000, at least 6,000, at least 7,000, at least 8,000, at least 9,000, or at least 10,000. Alternatively, the total number of learnable parameters may be any number less than 100, any number between 100 and 10,000, or a number greater than 10,000. In some instances, the total number of learnable parameters may be at most 10,000, at most 9,000, at most 8,000, at most 7,000, at most 6,000, at most 5,000, at most 4,000, at most 3,000, at most 2,000, at most 1,000, at most 500, at most 100 at most 10, or at most 1. Those of skill in the art will recognize that the total number of learnable parameters used may have any value within this range, for example, about 2,200 parameters.

Figure 12:
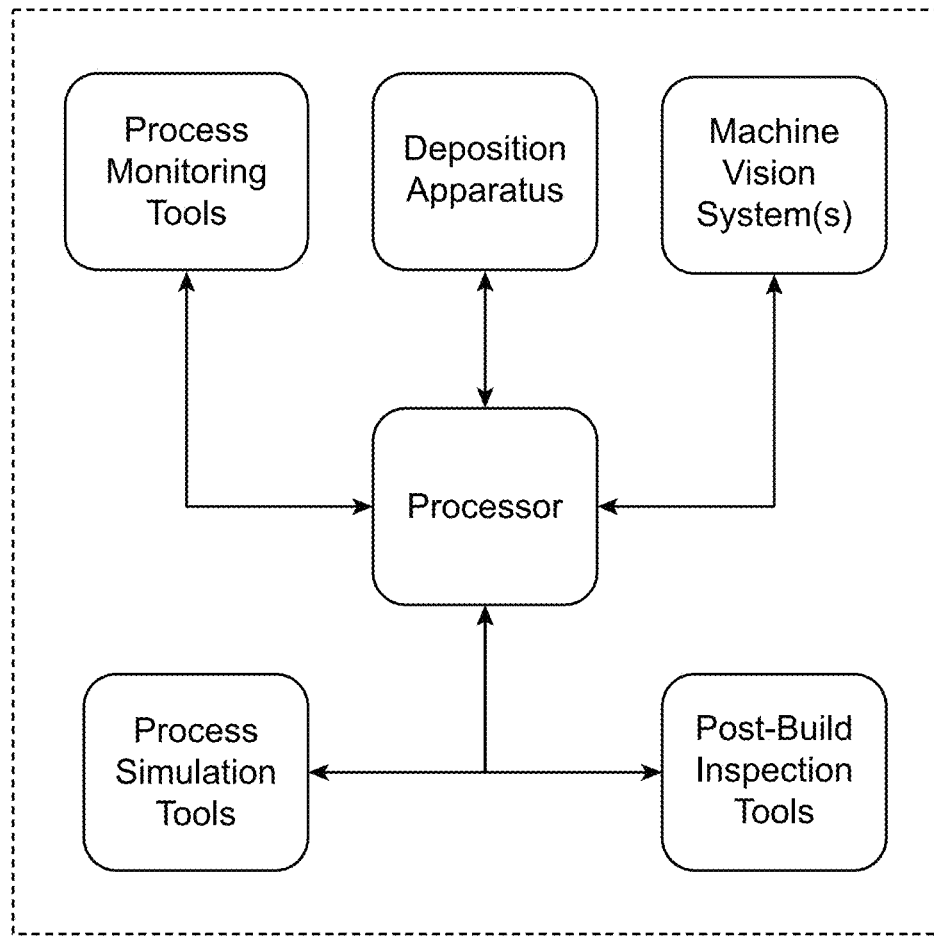
FIG. 12 provides a schematic illustration of an integrated system comprising an additive manufacturing deposition apparatus, machine vision systems and/or other process monitoring tools, process simulation tools, post-build inspection tools, and a processor for running a machine learning algorithm that utilizes data from the machine vision and/or process monitoring tools, the process simulation tools, the post-build inspection tools, or any combination thereof, to provide real-time adaptive control of the deposition process.

Integrated and Distributed Additive Manufacturing Systems:

In some embodiments, the adaptive, real-time process control methods of the present disclosure may be used for integrated additive manufacturing and/or welding systems (i.e., free form deposition or joining systems) that reside at a single physical/geographical location. FIG. 12 provides a schematic illustration of an integrated additive manufacturing system comprising a deposition apparatus, one or more machine vision systems and/or other process monitoring tools, process simulation tools, post-build inspection tools, and one or more processors for running a machine learning algorithm that utilizes data from the process simulation tools, machine vision and/or process monitoring tools (including in-process inspection and/or defect classification tools), post-build inspection tools, or any combination thereof, to provide real-time adaptive control of the deposition process, where the components of the system are located in the same physical/geographical location. In these embodiments, the processor may communicate with the individual system components through direct, hard-wired connections and/or via short-range communication links such as blue tooth or wifi connections. In some embodiments, two or more of the system components may be housed within an enclosure or housing (dashed line) that enables tighter control of fabrication environmental parameters such as temperature, pressure, atmospheric composition, etc.

Figure 13:
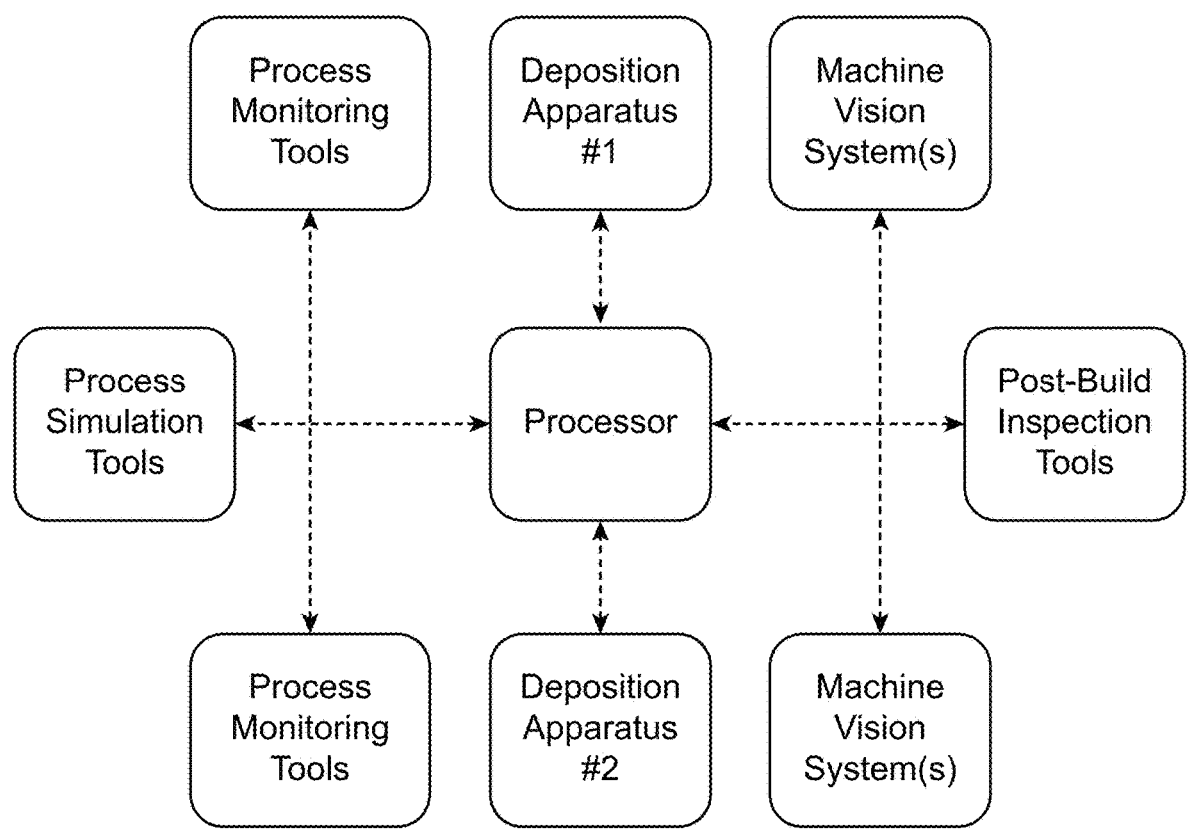
FIG. 13 provides a schematic illustration of a distributed system comprising an additive manufacturing deposition apparatus, machine vision systems and/or other process monitoring tools, process simulation tools, post-build inspection tools, and a processor for running a machine learning algorithm that utilizes data from the machine vision and/or process monitoring tools, the process simulation tools, the post-build inspection tools, or any combination thereof, to provide real-time adaptive control of the deposition process. In some embodiments, the different components or modules of the system may be physically located in different workspaces and/or worksites, and may be linked via a local area network (LAN), an intranet, an extranet, or the internet so that process data (e.g., training data, process simulation data, process control data, and post-build inspection data) and process control instructions may be shared and exchanged between the different modules.

FIG. 13 provides a schematic illustration of a distributed free form deposition system, e.g., an additive manufacturing system, comprising one or more deposition apparatus, process simulation tools, machine vision systems and/or other process monitoring tools, in-process inspection tools, post-build inspection tools, and one or more processors for running a machine learning algorithm that utilizes data from the machine vision and/or process monitoring tools, the process simulation tools, the post-build inspection tools, or any combination thereof, to provide real-time adaptive control of the deposition process, where the different components or modules of the system may be physically located in different workspaces and/or worksites (i.e. different physical/geographical locations), and may be linked via a local area network (LAN), an intranet, an extranet, or the internet so that process data (e.g., training data, process simulation data, process control data, in-process inspection data, and/or post-build inspection data) and process control instructions may be shared and exchanged between the different modules. In some embodiments, some of the co-localized system components (e.g., a deposition apparatus and a process monitoring tool) may be housed within a local enclosure or housing (not shown) that enables tighter control of fabrication environmental parameters such as temperature, pressure, atmospheric composition, etc.

Figure 14:
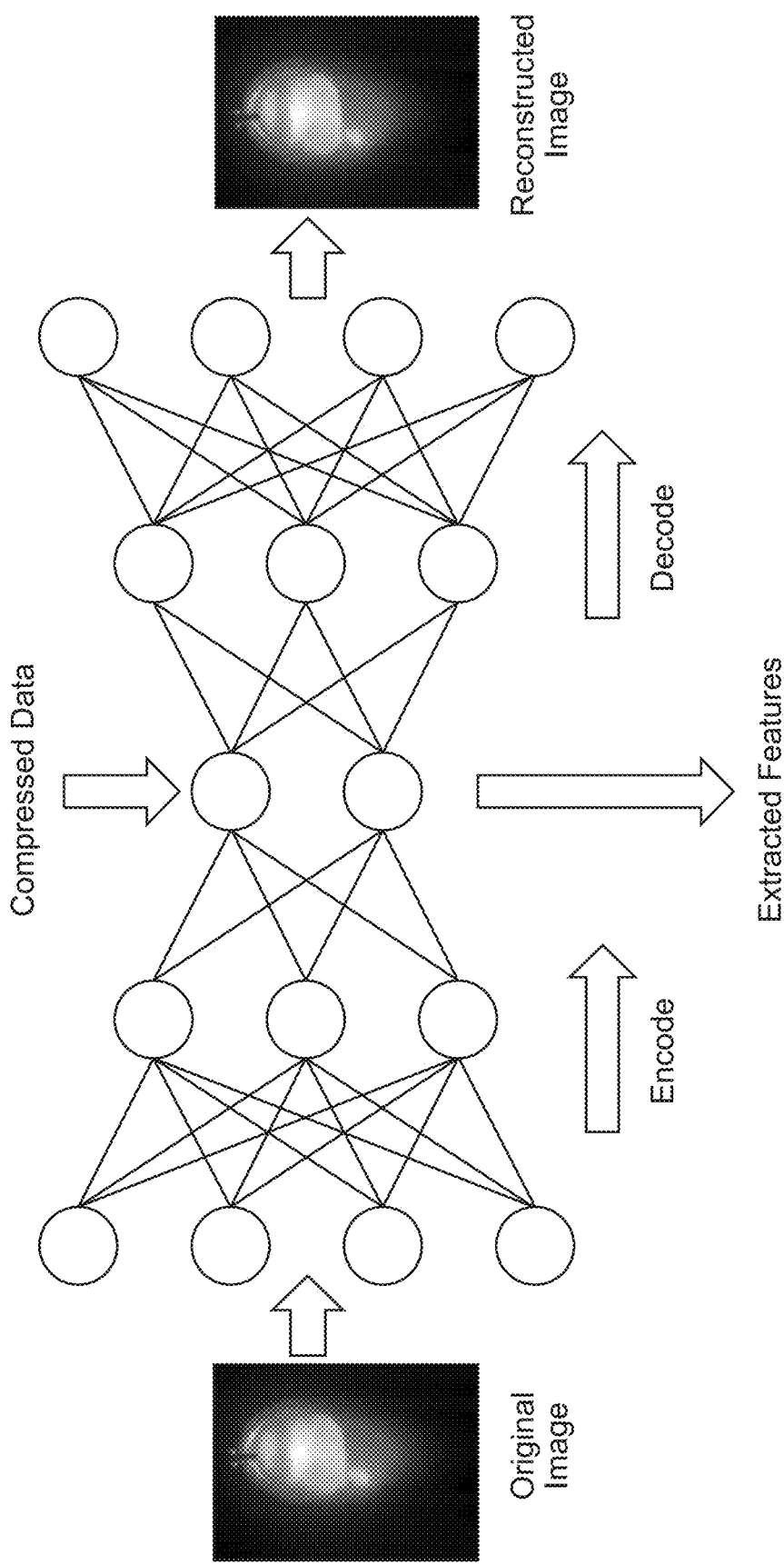
FIG. 14 illustrates one non-limiting example of an unsupervised feature extraction and data compression process.

For distributed systems, the sharing of data between one or more deposition apparatus, one or more process monitoring sensors, machine vision systems, and/or in-process inspection tools may be facilitated through the use of a data compression algorithm, a data feature extraction algorithm, or a data dimensionality reduction algorithm. FIG. 14 illustrates one non-limiting example of an unsupervised ANN-based approach to image feature extraction and data compression, whereby image data is conveniently compressed, transmitted, and reconstructed at a different physical/geographical location from that at which it was acquired.

Processors & Computer Systems:

One or more processors may be employed to implement the machine learning algorithms, automated object defect classification methods, and additive manufacturing process control methods disclosed herein. The one or more processors may comprise a hardware processor such as a central processing unit (CPU), a graphic processing unit (GPU), a general-purpose processing unit, or computing platform. The one or more processors may be comprised of any of a variety of suitable integrated circuits, microprocessors, logic devices and the like. Although the disclosure is described with reference to a processor, other types of integrated circuits and logic devices may also be applicable. The processor may have any suitable data operation capability. For example, the processor may perform 512 bit, 256 bit, 128 bit, 64 bit, 32 bit, or 16 bit data operations. The one or more processors may be single core or multi core processors, or a plurality of processors configured for parallel processing.

The one or more processors, or the automated additive manufacturing deposition apparatus and control system itself, may be part of a larger computer system and/or may be operatively coupled to a computer network (a "network") with the aid of a communication interface to facilitate transmission of and sharing of data and predictive results. The network may be a local area network, an intranet and/or extranet, an intranet and/or extranet that is in communication with the Internet, or the Internet. The network in some cases is a telecommunication and/or data network. The network may include one or more computer servers, which in some cases enables distributed computing, such as cloud computing. The network, in some cases with the aid of the computer system, may implement a peer-to-peer network, which may enable devices coupled to the computer system to behave as a client or a server.

The computer system may also include memory or memory locations (e.g., random-access memory, read-only memory, flash memory), electronic storage units (e.g., hard disks), communication interfaces (e.g., network adapters) for communicating with one or more other systems, and peripheral devices, such as cache, other memory, data storage and/or electronic display adapters. The memory, storage units, interfaces and peripheral devices may be in communication with the one or more processors, e.g., a CPU, through a communication bus, e.g., as is found on a motherboard. The storage unit(s) may be data storage unit(s) (or data repositories) for storing data.

The one or more processors, e.g., a CPU, execute a sequence of machine-readable instructions, which are embodied in a program (or software). The instructions are stored in a memory location. The instructions are directed to the CPU, which subsequently program or otherwise configure the CPU to implement the methods of the present disclosure. Examples of operations performed by the CPU include fetch, decode, execute, and write back. The CPU may be part of a circuit, such as an integrated circuit. One or more other components of the system may be included in the circuit. In some cases, the circuit is an application specific integrated circuit (ASIC).

The storage unit stores files, such as drivers, libraries and saved programs. The storage unit stores user data, e.g., user-specified preferences and user-specified programs. The computer system in some cases may include one or more additional data storage units that are external to the computer system, such as located on a remote server that is in communication with the computer system through an intranet or the Internet.

Some aspects of the methods and systems provided herein, such as the disclosed object defect classification or additive manufacturing process control algorithms, are implemented by way of machine (e.g., processor) executable code stored in an electronic storage location of the computer system, such as, for example, in the memory or electronic storage unit. The machine executable or machine readable code is provided in the form of software. During use, the code is executed by the one or more processors. In some cases, the code is retrieved from the storage unit and stored in the memory for ready access by the one or more processors. In some situations, the electronic storage unit is precluded, and machine-executable instructions are stored in memory. The code may be pre-compiled and configured for use with a machine having one or more processors adapted to execute the code, or may be compiled at run time. The code may be supplied in a programming language that is selected to enable the code to execute in a pre-compiled or as-compiled fashion.

Various aspects of the technology may be thought of as "products" or "articles of manufacture" typically in the form of machine (or processor) executable code and/or associated data that is stored in a type of machine readable medium. Machine-executable code may be stored in an optical storage unit comprising an optically readable medium such as an optical disc, CD-ROM, DVD, or Blu-Ray disc. Machine-executable code may be stored in an electronic storage unit, such as memory (e.g., read-only memory, random-access memory, flash memory) or on a hard disk. "Storage" type media include any or all of the tangible memory of the computers, processors or the like, or associated modules thereof, such as various semiconductor memory chips, optical drives, tape drives, disk drives and the like, which may provide non-transitory storage at any time for the software that encodes the methods and algorithms disclosed herein.

All or a portion of the software code may at times be communicated via the Internet or various other telecommunication networks. Such communications, for example, enable loading of the software from one computer or processor into another, for example, from a management server or host computer into the computer platform of an application server. Thus, other types of media that are used to convey the software encoded instructions include optical, electrical and electromagnetic waves, such as those used across physical interfaces between local devices, through wired and optical landline networks, and over various atmospheric links. The physical elements that carry such waves, such as wired or wireless links, optical links, or the like, are also considered media that convey the software encoded instructions for performing the methods disclosed herein. As used herein, unless restricted to non-transitory, tangible "storage" media, terms such as computer or machine "readable medium" refer to any medium that participates in providing instructions to a processor for execution.

The computer system typically includes, or may be in communication with, an electronic display for providing, for example, images captured by a machine vision system. The display is typically also capable of providing a user interface (UI). Examples of UI's include, but are not limited to, graphical user interfaces (GUIs), web-based user interfaces, and the like.

Applications:

The disclosed automated object defect classification and adaptive, real-time free form deposition or joining (including additive manufacturing and welding) process control methods and systems may be used in any of a variety of industrial applications including but not limited to, the fabrication of parts and assemblies in the automotive industry, the aeronautics industry, the medical device industry, the consumer electronics industry, etc. For example, high volume applications for welding processes include use in the automotive industry for welding car bodies, as well as use in the oil and gas industry for construction of wells and refineries, and in the marine (shipbuilding) industry.

EXAMPLES

These examples are provided for illustrative purposes only and not intended to limit the scope of the claims provided herein.

Prophetic Example 1—Automated Object Defect Classification

The machine learning algorithm-based automated object defect classification methods and systems disclosed herein provide a key component for enabling adaptive, real-time additive manufacturing (or welding) process control. The methods comprise the use of a machine learning algorithm to analyze in-process or post-build inspection data for the purpose of identifying object defects and classifying them according to a specified set of fabrication quality criteria, and in some embodiments, further provide input data for real-time adaptive process control.

Figure 15:
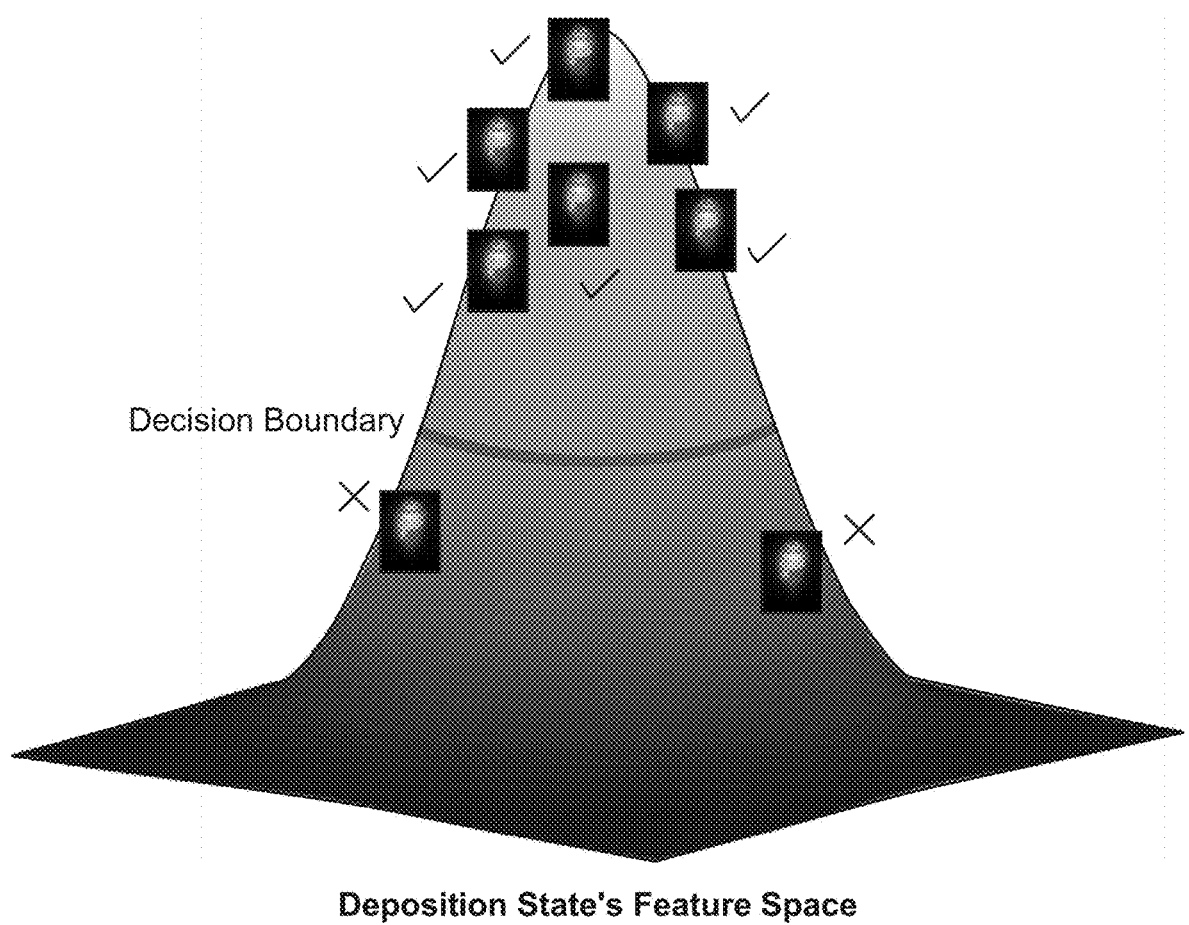
FIG. 15 illustrates the expected outcome for one non-limiting example of an unsupervised machine learning process for classification of object defects.

FIG. 15 provides a schematic illustration of the expected outcome for an unsupervised machine learning process for classification of object defects. One or more automated inspection tools, e.g., machine vision systems coupled with automated image processing algorithms, are used to monitor and measure feature dimensions, angles, surface finishes, and/or other properties of fabricated parts both in-process and post-build. Defects may be identified, e.g., by removing noise from the inspection data and subtracting a reference data set (e.g., a reference image of a defect-free part in the case that machine vision tools are being utilized for inspection), and classified using an unsupervised machine learning algorithm such as cluster analysis or an artificial neural network, to classify individual objects as either meeting or failing to meet a specified set of decision criteria (e.g., a decision boundary) in the feature space in which defects are being monitored. Tracking of the process control parameters and process monitoring data that were used to fabricate a set of objects (including both those that met the decision criteria and those that did not) provides training data for the machine learning algorithm used to run fabrication process control.

Prophetic Example 2—Adaptive, Real-Time Additive Manufacturing Process Control

FIG. 10 shows one non-limiting example of an ANN architecture used for real-time, adaptive process control of an additive manufacturing (or welding) process. In FIG. 10, the input layer comprises one or more real-time streams of process and/or object property data that provide an indication of the current state of the fabrication process and/or the part being fabricated. Examples of suitable input data streams include, but are not limited to, process simulation data (e.g., FEA simulation data), process monitoring or characterization data, in-process inspection data, post-build inspection data, or any combination thereof, as well as a list of process control parameters that may be adjusted to implement next step actions to achieve a target (or future) fabrication state. This data is fed to the ANN, which in many cases has been previously trained using one or more training data sets comprising process simulation data, process monitoring or characterization data, in-process inspection data, post-build inspection data, or any combination thereof, from previous fabrication runs of the same or different types of parts. The hidden or intermediate layers of the ANN act as trained feature extractors, while the output layer in the example of FIG. 10 provides a determination of a predicted future build state. As noted above, the ANN model is trained to predict future build state based on current build state and a set of actions. Once the ANN model has been developed (i.e., the model can map current state and process parameters to a future state) it's use can be extended to the determination of a set of process control parameter adjustments for the next N states. The ANN model is a first step in creating an action-value function, and determining the next sequence of actions for a given build step (as depicted in FIG. 8) is a second step in developing adaptive, real-time process control.

In some embodiments, a neural network model may be used directly to determine adjustments to process control parameters. This will typically involve a more difficult "training" or "learning" process. Initially, the machine is allowed to choose randomly from a range of values for each input process control parameter or action. If the sequence of process control parameter adjustments or actions leads to a flaw or defect, it is scored as leading to an undesirable (or negative) outcome. Repetition of the process using different sets of randomly chosen values for each process control parameter or action leads to reinforcement of those sequences that least to desirable (or positive) outcomes. Ultimately, the neural network model "learns" what adjustments to make to a set or sequence of deposition process control parameters or actions in order to achieve the target outcome, i.e., a defect-free printed part.

Figure 16A:
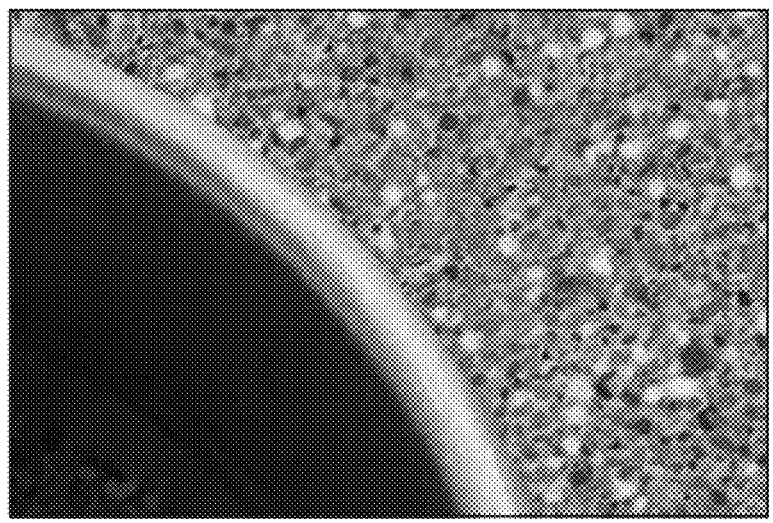
FIGS. 16A-C provide an example of post-process image feature extraction and correlation with build-time actions.
Figure 16B:
Figure 16C:
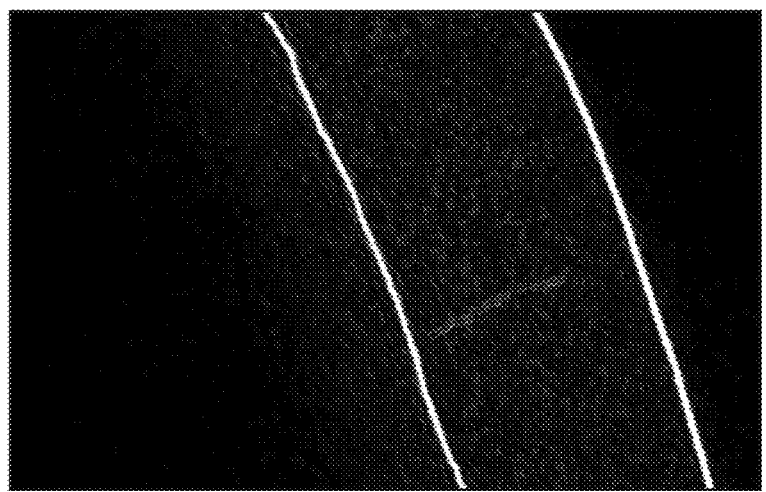

Example 3—Post-Process Image Feature Extraction and Correlation with Build-Time Actions FIGS. 16A-C provide an example of in-process and post-process image feature extraction and correlation of part features with build-time actions. FIG. 16A: image of the part after the build process has been completed. FIG. 16B: example of post-build inspection output (in this case, a computerized tomography (CT) scan of the part). FIG. 16C: image obtained using a feature extraction algorithm to process the CT scan shown in FIG. 16B. In some embodiments, automated feature extraction allows one to correlate part features with build-time actions. During the build (e.g., when printing), in addition to building a machine learning model that correlates process control parameters (e.g., laser power, feed rate, travel speed, etc.) and result of the deposition process (e.g., the shape of melt pool, defects in the melt pool, etc.), one may also create a mapping between the process control parameters and a specific location in the part. This allows one to subsequently index post-build inspection data on the part and correlate findings from post-build inspection with process control parameters that are specific to a region of interest, thereby expanding the machine learning model to include post-build inspection data.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in any combination in practicing the invention. It is intended that the following claims define the scope of the invention and that methods and structures within the scope of these claims and their equivalents be covered thereby.

What is claimed is:

1. A method for real-time adaptive control of a post-design free form deposition process or a post-design joining process, the method comprising:
   a) providing an input design geometry for an object;
   b) providing a training data set, wherein the training data set comprises:
      (i) past process simulation data, past process characterization data, past in-process physical inspection data, or past post-build physical inspection data, for a plurality of objects that comprise at least one object that is different from the object to be physically fabricated that is provided in step (a); and
      (ii) training data generated through a repetitive process of randomly choosing values for each of one or more input process control parameters and scoring adjustments to the input process control parameters as leading to either undesirable or desirable outcomes, the outcomes based respectively on the presence or absence of defects detected in a fabricated object arising from the process control parameter adjustments;
   c) providing one or more sensors, wherein the one or more sensors provide real-time data for one or more object properties as the object is being physically fabricated; and
   d) providing a processor programmed to:
      (i) predict an optimal set of one or more process control parameters for initiating the free form deposition process or joining process, wherein the predicted optimal set of one or more process control parameters are derived using a machine learning algorithm that has been trained using the training data set of step (b);
      (ii) provide a real-time classification of detected object defects using the machine learning algorithm that has been trained using the training data set of step (b), wherein the real-time data from the one or more sensors is provided as input to the machine learning algorithm, and wherein the real-time classification of detected object defects is output from the machine learning algorithm; and
      (iii) provide instructions to perform the post-design free form deposition process or post-design joining process to fabricate the object, wherein the machine learning algorithm adjusts the one or more process control parameters in real-time while physically performing the free form deposition process or the joining process.

2. The method of claim 1, wherein steps (b) through (d) are performed iteratively and process characterization data, in-process inspection data, or post-build inspection data for each iteration is incorporated into the training data set.

3. The method of claim 1, wherein the free form deposition process or joining process is a stereolithography (SLA), digital light processing (DLP), fused deposition modeling (FDM), selective laser sintering (SLS), selective laser melting (SLM), electronic beam melting (EBM), or welding process.

4. The method of claim 1, wherein the machine learning algorithm comprises an artificial neural network algorithm, a Gaussian process regression algorithm, a logistical model tree algorithm, a random forest algorithm, a fuzzy classifier algorithm, a decision tree algorithm, a hierarchical clustering algorithm, a k-means algorithm, a fuzzy clustering algorithm, a deep Boltzmann machine learning algorithm, a deep convolutional neural network algorithm, a deep recurrent neural network, or any combination thereof.

5. The method of claim 1, wherein the method is implemented using either: (i) a single integrated system comprising a deposition or joining apparatus, a sensor, and a processor; or (ii) a distributed, modular system comprising a first deposition or joining apparatus, a first sensor, and a first processor, wherein the first deposition or joining apparatus, the first sensor, and the first processor are configured to share training data and real-time process characterization data via a local area network (LAN), an intranet, an extranet, or an internet.

6. The method of claim 1, wherein the training data set further comprises process characterization data, in-process inspection data, or post-build inspection data that is generated by an operator while manually adjusting the input process control parameters.

7. The method of claim 1, wherein the one or more sensors comprise at least one laser interferometer, machine vision system, or sensor that detects electromagnetic radiation that is reflected, scattered, absorbed, transmitted, or emitted by the object.

8. The method of claim 1, wherein the one or more sensors provide data on acoustic energy or mechanical energy that is reflected, scattered, absorbed, transmitted, or emitted by the object.

9. The method of claim 1, wherein the object defects are detected as differences between object property data and a reference data set that are larger than a specified threshold, and are classified using a one-class support vector machine (SVM) or autoencoder algorithm.

10. The method of claim 1, wherein the object defects are detected and classified using an unsupervised one-class support vector machine (SVM), autoencoder, clustering, or nearest neighbor (kNN) machine learning algorithm and a training data set that comprises object property data for defective and defect-free objects.

11. A system for controlling a post-design free form deposition process or a post-design joining process, the system comprising:
a) a first deposition or joining apparatus for physically fabricating an object based on an input design geometry;
b) one or more process characterization sensors, wherein the one or more process characterization sensors provide real-time data for one or more process parameters or object properties; and
c) a processor programmed to:
(i) provide a predicted optimal set of one or more process control parameters for initiating the free form deposition process or joining process using a machine learning algorithm;
(ii) provide a real-time classification of object defects using the machine learning algorithm, wherein the real-time object property data from the one or more process characterization sensors is provided as input to the machine learning algorithm, and wherein the real-time classification of detected object defects is output from the machine learning algorithm; and
(iii) provide instructions to perform the post-design free form deposition process or post-design joining process to fabricate the object, wherein the machine learning algorithm adjusts the one or more process control parameters in real-time while physically performing the free form deposition process or the joining process, and wherein the machine learning algorithm has been trained using a training data set that comprises:
i) past process simulation data, past process characterization data, past in-process physical inspection data, or past post-build physical inspection data, for a plurality of objects that comprise at least one object that is different from the object to be physically fabricated that is provided in step (a); and
ii) training data generated through a repetitive process of randomly choosing values for each of one or more input process control parameters and scoring adjustments to the input process control parameters as leading to either undesirable or desirable outcomes, the outcomes based respectively on the presence or absence of defects detected in a fabricated object arising from the process control parameter adjustments.

12. The system of claim 11, wherein the first deposition or joining apparatus, the one or more process characterization sensors, and the processor are configured as: (i) a single integrated system; or (ii) as distributed system modules that share training data and real-time process characterization data via a local area network (LAN), an intranet, an extranet, or an internet.

13. The system of claim 11, wherein the one or more process characterization sensors comprise at least one laser interferometer, machine vision system, or sensor that detects electromagnetic radiation that is reflected, scattered, absorbed, transmitted, or emitted by the object.

14. The system of claim 11, wherein the one or more process characterization sensors provide data on acoustic energy or mechanical energy that is reflected, scattered, absorbed, transmitted, or emitted by the object.

15. The system of claim 11, wherein the object defects are detected as differences between object property data and a reference data set that are larger than a specified threshold, and are classified using a one-class support vector machine (SVM) or autoencoder algorithm.

16. The system of claim 11, wherein the object defects are detected and classified using an unsupervised one-class support vector machine (SVM), autoencoder, clustering, or nearest neighbor (kNN) machine learning algorithm and a training data set that comprises object property data for defective and defect-free objects.

17. The system of claim 11, wherein the first deposition or joining apparatus is a stereolithography (SLA) apparatus, digital light processing (DLP) apparatus, fused deposition modeling (FDM) apparatus, selective laser sintering (SLS) apparatus, selective laser melting (SLM) apparatus, electronic beam melting (EBM) apparatus, or welding apparatus.

18. The system of claim 11, wherein the machine learning algorithm comprises an artificial neural network algorithm, a Gaussian process regression algorithm, a logistical model tree algorithm, a random forest algorithm, a fuzzy classifier algorithm, a decision tree algorithm, a hierarchical clustering algorithm, a k-means algorithm, a fuzzy clustering algorithm, a deep Boltzmann machine learning algorithm, a deep convolutional neural network algorithm, a deep recurrent neural network, or any combination thereof.

19. The system of claim 11, wherein the training data set further comprises process characterization data, in-process inspection data, or post-build inspection data that is generated by an operator while manually adjusting the process control parameters.

* * * * *

UNITED STATES PATENT AND TRADEMARK OFFICE
CERTIFICATE OF CORRECTION

| | | |
|---|---|---|
| PATENT NO. | : 10,921,782 B2 | Page 1 of 1 |
| APPLICATION NO. | : 16/696720 | |
| DATED | : February 16, 2021 | |
| INVENTOR(S) | : Edward Mehr, Timothy A. Ellis and Jordan Noone | |

It is certified that error appears in the above-identified patent and that said Letters Patent is hereby corrected as shown below:

On the Title Page

Item (72), remove "Tim" and add --Timothy A.--.

Signed and Sealed this
Fourteenth Day of November, 2023

*Katherine Kelly Vidal*

Katherine Kelly Vidal
*Director of the United States Patent and Trademark Office*